United States Patent
Wong et al.

(10) Patent No.: US 12,096,909 B2
(45) Date of Patent: Sep. 24, 2024

(54) SYSTEMS AND METHODS FOR VISUAL DOCKING IN AN AUTONOMOUS MOBILE ROBOT

(71) Applicant: iRobot Corporation, Bedford, MA (US)

(72) Inventors: Cheuk Wah Wong, Concord, MA (US); John P. O'Brien, Newton, MA (US); Milan Modh, Waltham, MA (US)

(73) Assignee: iRobot Corporation, Bedford, MA (US)

( * ) Notice: Subject to any disclaimer, the term of this patent is extended or adjusted under 35 U.S.C. 154(b) by 599 days.

(21) Appl. No.: 17/363,107

(22) Filed: Jun. 30, 2021

(65) Prior Publication Data

US 2022/0047138 A1 Feb. 17, 2022

Related U.S. Application Data

(60) Provisional application No. 63/065,667, filed on Aug. 14, 2020.

(51) Int. Cl.
  *A47L 9/28* (2006.01)
  *G05D 1/00* (2006.01)

(52) U.S. Cl.
  CPC .......... *A47L 9/2873* (2013.01); *A47L 9/2805* (2013.01); *A47L 9/2857* (2013.01);
  (Continued)

(58) Field of Classification Search
  CPC .... A47L 9/2873; A47L 9/2805; A47L 9/2857; A47L 2201/022; A47L 2201/04;
  (Continued)

(56) References Cited

U.S. PATENT DOCUMENTS

2002/0153185 A1* 10/2002 Song ....................... A47L 9/009
  180/167
2013/0261867 A1* 10/2013 Burnett ................ G05D 1/0225
  359/350

(Continued)

OTHER PUBLICATIONS

Aalerud et. al., Automatic Calibration of an Industrial RGB-D Camera Network Using Retroreflective Fiducial Markers (Year: 2019).*

(Continued)

*Primary Examiner* — Adam R Mott
*Assistant Examiner* — Sagar K C
(74) *Attorney, Agent, or Firm* — Schwegman Lundberg & Woessner, P.A.

(57) ABSTRACT

Systems, devices, and methods for docking a mobile robot to a dock using distinct visual fiducial markers on the dock are disclosed. A mobile robot system is provided that includes a dock and a mobile cleaning robot. The dock includes a first fiducial marker in a first plane on the dock and second one or more fiducial markers in a second plane different from the first plane. The mobile cleaning robot includes a visual system to detect the first and the second one or more fiducial markers, and a controller circuit to recognize the dock, and to determine a pose or heading direction of the mobile cleaning robot based on the detected first and the second one or more fiducial markers. The mobile drive system can adjust its heading direction, and drive to the dock according to the adjusted heading direction.

29 Claims, 17 Drawing Sheets

(52) U.S. Cl.
CPC ......... *G05D 1/0225* (2013.01); *G05D 1/0244* (2013.01); *A47L 2201/022* (2013.01); *A47L 2201/04* (2013.01)

(58) Field of Classification Search
CPC ............ A47L 2201/024; A47L 9/2894; G05D 1/0225; G05D 1/0244; G05D 1/0234
See application file for complete search history.

(56) References Cited

U.S. PATENT DOCUMENTS

| | | | |
|---|---|---|---|
| 2014/0100693 A1* | 4/2014 | Fong | A47L 9/2894 700/253 |
| 2016/0091899 A1* | 3/2016 | Aldred | B60L 50/52 901/1 |
| 2016/0167226 A1* | 6/2016 | Schnittman | G06F 18/217 901/1 |
| 2017/0261975 A1* | 9/2017 | Liu | G05D 1/0676 |
| 2018/0050634 A1* | 2/2018 | White | B60Q 1/543 |

OTHER PUBLICATIONS

"Chinese Application Serial No. 202121920381.7, Response filed Mar. 25, 2022 to Notification to Make Rectification mailed Jan. 10, 2022", w English Claims, 85 pgs.

\* cited by examiner

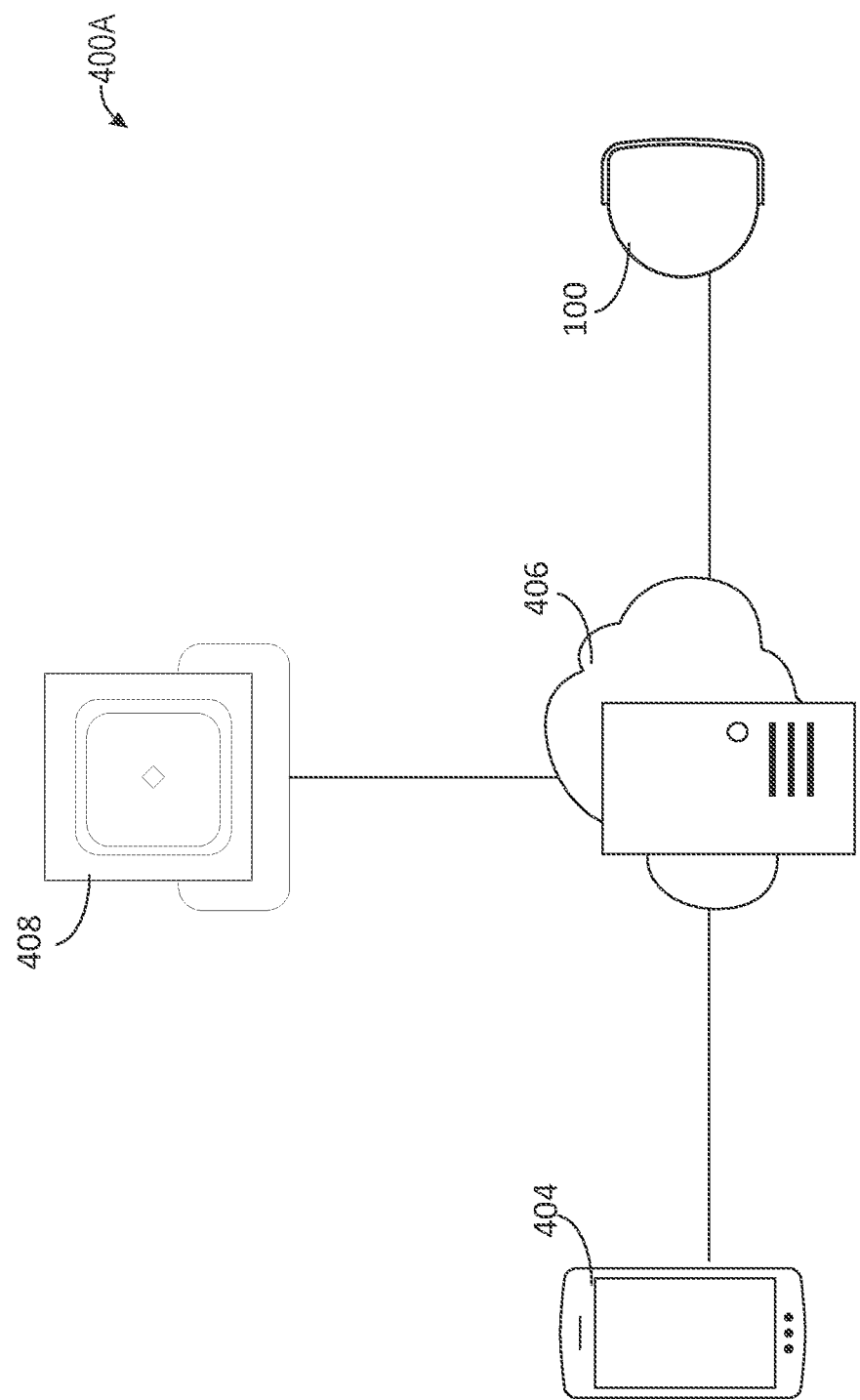

SYSTEMS AND METHODS FOR VISUAL DOCKING IN AN AUTONOMOUS MOBILE ROBOT

PRIORITY APPLICATIONS

This application claims the benefit of priority to U.S. Provisional Application Ser. No. 63/065,667, filed Aug. 14, 2020, the content of which is hereby incorporated by reference in its entirety.

TECHNICAL FIELD

This document relates generally to mobile robots and, more particularly, to systems and methods for docking a mobile robot to a docking station.

BACKGROUND

Autonomous mobile robots can move about an environment, and perform several functions and operations in a variety of categories, including but not limited to security operations, infrastructure or maintenance operations, navigation or mapping operations, inventory management operations, and robot/human interaction operations. Some mobile robots, known as mobile cleaning robots, can autonomously perform cleaning tasks within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

Some mobile robots are capable of performing self-charging at a docking station (also referred to as a "dock") located in the robot environment whenever the battery level reaches a low enough value. Some mobile cleaning robots can temporarily store debris in a bin included in the mobile cleaning robot. When docked at the dock, the mobile cleaning robot can empty the debris into a receptacle of the dock. Some mobile robots can detect the dock and navigate until docked, engage with the dock to charge the battery, and/or to empty the debris. After completing a cleaning mission, the mobile cleaning robot can return to the dock and stay there until the next cleaning mission.

SUMMARY

This document describes systems and methods for docking a mobile robot to a dock using visual fiducial markers disposed at different locations on the dock. The visual fiducial markers can be retroreflective makers positioned in different planes, thus forming a three-dimensional (3D) fiducial system. In accordance with various examples, a mobile robot system is provided that includes a dock and a mobile cleaning robot. The dock can include a first fiducial marker in a first plane on the dock, and second one or more fiducial markers in a second plane different from the first plane. The second plane can be non-coplanar with the first plane. The mobile cleaning robot includes a drive system to move the mobile cleaning robot about an environment including a docking area within a distance of the dock, a visual system to detect the first and the second one or more fiducial markers even in low-light conditions, and a controller circuit to recognize the dock based on the detected first fiducial marker. The control circuit can determine a pose or heading direction of the mobile cleaning robot with respect to the dock based on the detected first fiducial marker and the second one or more fiducial markers. The controller circuit can generate a control signal to the drive system to adjust the heading direction of the mobile cleaning robot, and to drive the mobile cleaning robot to the dock according to the adjusted heading direction.

Example 1 is a mobile robot system comprising a dock and a mobile cleaning robot. The dock comprises a first fiducial marker in a first plane, and second one or more fiducial markers in a second plane different from the first plane. The mobile cleaning robot comprises: a drive system configured to move the mobile cleaning robot about an environment including a docking area within a distance of the dock; a visual system configured to detect the first fiducial marker and the second one or more fiducial markers on the dock; and a controller circuit configured to: recognize the dock based at least on the detected first fiducial marker; determine a heading direction of the mobile cleaning robot with respect to the dock using the detected first fiducial marker and the detected second one or more fiducial markers; and generate a control signal to the drive system to adjust the heading direction, and to drive the mobile cleaning robot to the dock in accordance with the adjusted heading direction.

In Example 2, the subject matter of Example 1 optionally includes the dock that can include a back plane behind a docking platform for receiving the mobile cleaning robot on the dock. The first plane can be offset from the back plane by a first distance, and the second plane can be offset from the back plane by a second distance different from the first distance.

In Example 3, the subject matter of Example 2 optionally includes the first and second planes that can be each substantially parallel to the back plane, and the second distance is greater than the first distance.

In Example 4, the subject matter of any one or more of Examples 2-3 optionally includes the second plane coplanar with the back plane.

In Example 5, the subject matter of any one or more of Examples 1-4 optionally includes the first fiducial marker that can include a retroreflective artificial tag comprising a first area in a first color and a second area in a second color different from the first color, the first area having a higher retro-reflectance than the second area.

In Example 6, the subject matter of any one or more of Examples 1-5 optionally includes the second one or more fiducial markers that can be each laterally offset from the first fiducial marker.

In Example 7, the subject matter of any one or more of Examples 1-6 optionally includes the second one or more fiducial markers that can include a second fiducial marker laterally offset from the first fiducial marker in a first lateral direction, and a third fiducial marker laterally offset from the first fiducial marker in a second lateral direction opposite the first lateral direction.

In Example 8, the subject matter of any one or more of Examples 1-7 optionally includes the second one or more fiducial markers that are each disposed at, or in proximity to, respective one or more charging contacts on a docking platform of the dock, the one or more charging contacts electrically coupled to a charging system of the dock configured to charge a battery of the mobile cleaning robot.

In Example 9, the subject matter of Example 8 optionally includes the mobile cleaning robot that can include a light source configured to emit light, the second one or more fiducial markers each including respective retroreflective coatings attached to, or placed in proximity to, the respective one or more charging contacts, the retroreflective coatings configured to reflect the emitted light incident thereon back to the visual system of the mobile cleaning robot.

In Example 10, the subject matter of Example 9 optionally includes the one or more charging contacts that can include a first charging contact mounted over a base structure elevated above a horizontal surface of a charging platform of the dock, the first charging contact having a through-hole to expose a surface portion of the base structure behind the through-hole; and the second one or more fiducial markers include a second fiducial marker comprising a retroreflective coating attached to the exposed surface portion behind the through-hole.

In Example 11, the subject matter of Example 10 optionally includes the through-hole of the first charging contact that can be sized and shaped to receive a raised portion of the base structure. The retroreflective coating of the second fiducial marker can be attached to the raised portion of the base structure.

In Example 12, the subject matter of Example 11 optionally includes the raised portion of the base structure that can substantially flush with an exterior surface of the charging contact abutting the through-hole.

In Example 13, the subject matter of any one or more of Examples 1-12 optionally includes the controller circuit that can be configured to determine the heading direction including determining an angle offset from normal to a back plane of the dock, and to generate the control signal to the drive system to adjust the heading direction of the mobile cleaning robot until the determined angle is within a specific angle range.

In Example 14, the subject matter of any one or more of Examples 1-13 optionally includes the visual system that can include an imaging sensor configured to produce an image of the dock, and an image processor configured to process the image, and to detect, from the processed image, respective positions of the first and the second one or more fiducial markers.

In Example 15, the subject matter of Example 14 optionally includes the controller circuit that can be configured to determine the heading direction using the detected positions of the second one or more fiducial markers relative to the detected position of the first fiducial marker.

In Example 16, the subject matter of Example 15 optionally includes the two of the more second fiducial markers that can include a second fiducial marker and a third fiducial marker. The controller circuit can be configured to measure, from the image of the dock, a first distance between the detected first fiducial marker and the detected second fiducial marker, and a second distance between the detected first fiducial marker and the detected third fiducial marker, and determine the heading direction based on a comparison between the first distance and the second distance.

In Example 17, the subject matter of any one or more of Examples 15-16 optionally includes the controller circuit that can be configured to: receive dock dimension information including actual positions of the second one or more fiducial markers relative to the first fiducial marker; estimate positions of the second one or more fiducial markers using (1) the detected position of the first fiducial marker and (2) the actual positions of the second one or more fiducial markers relative to the first fiducial marker; and determine the heading direction based on a comparison between the estimated positions of the second one or more fiducial markers and the detected positions of the second one or more fiducial markers.

In Example 18, the subject matter of any one or more of Examples 15-17 optionally includes the first fiducial marker that can include a polygonal retroreflective artificial tag. The controller circuit can be configured to: detect a position of at least one corner of the polygonal retroreflective artificial tag; and determine the heading direction further using the detected position of the at least one corner of the polygonal retroreflective artificial tag.

In Example 19, the subject matter of any one or more of Examples 14-18 optionally includes the controller circuit that can be configured to: receive dock dimension information including an actual distance between two fiducial markers selected from the first and second one or more fiducial markers; measure, from the image of the dock, a distance between the two fiducial markers; and determine the heading direction based on a difference between the measured distance and the actual distance between the two fiducial markers.

In Example 20, the subject matter of Example 19 optionally includes the controller circuit that can be configured to: calculate a projection component of the actual distance along a horizontal direction or along a vertical direction on a back plane of the dock; calculate a projection component of the measured distance along the horizontal direction or along the vertical direction; and determine the heading direction based on a difference between the projection component of the measured distance and the projection component of the actual distance.

In Example 21, the subject matter of any one or more of Examples 1-20 optionally includes the controller circuit that can be configured to: determine the heading direction, including (1) determining a first heading direction using the detected first fiducial marker if the robot is at a first distance away from the dock, and (2) determining a second heading direction using both the detected first fiducial marker and the detected second one or more fiducial markers if the robot is at a second distance closer to the dock than the first distance; and generate the control signal, including (1) when the robot is at first distance away from the dock, generating a control signal to adjust the first heading direction and to drive the mobile cleaning robot toward the dock in accordance with the adjusted first heading direction until the robot is at the second distance away from the dock, and (2) when the robot is at the second distance away from the dock, generating a control signal to adjust the second heading direction and to drive the mobile cleaning robot to the dock in accordance with the adjusted second heading direction.

In Example 22, the subject matter of any one or more of Examples 1-21 optionally includes the controller circuit that can be configured to generate a docking status indicator for displaying on a user interface.

Example 23 is a method for docking a mobile cleaning robot to a dock, comprising: providing the dock that includes a first fiducial marker in a first plane and second one or more fiducial markers in a second plane different from the first plane; generating an image of the dock via a visual system of the mobile cleaning robot prior to docking, and detecting from the image the first and the second one or more fiducial markers; recognizing, via a controller circuit of the mobile cleaning robot, the dock based on the detected first fiducial marker; determining, via the controller circuit, a heading direction of the mobile cleaning robot with respect to the dock using the detected first and the second one or more fiducial markers; and adjusting, via a drive system of the mobile cleaning robot, the heading direction of the mobile cleaning robot, and docking the mobile cleaning robot on the dock according to the adjusted heading direction.

In Example 24, the subject matter of Example 23 optionally includes the second one or more fiducial markers that can each be laterally offset from the first fiducial marker.

In Example 25, the subject matter of any one or more of Examples 23-24 optionally includes the second one or more fiducial markers each including respective retroreflective coatings attached to, or in proximity to, respective one or more charging contacts on a docking platform of the dock, the one or more charging contacts electrically coupled to a charging system of the dock to charge a battery of the mobile cleaning robot.

In Example 26, the subject matter of any one or more of Examples 23-25 optionally includes: determining the heading direction that can include determining a first heading direction using the detected first fiducial marker if the robot is at a first distance away from the dock, and determining a second heading direction using both the detected first fiducial marker and the detected second one or more fiducial markers if the robot is at a second distance closer to the dock than the first distance; and adjusting the heading direction and docking the mobile cleaning robot that can include: responsive to the mobile cleaning robot being at first distance away from the dock, adjusting the first heading direction and driving the mobile cleaning robot toward the dock in accordance with the adjusted first heading direction until the robot is at the second distance away from the dock; and responsive to the mobile cleaning robot being at second distance away from the dock, adjusting the second heading direction and driving the mobile cleaning robot to the dock in accordance with the adjusted second heading direction.

In Example 27, the subject matter of any one or more of Examples 23-26 optionally includes the one or more second fiducial markers that can include a second fiducial marker and a third fiducial marker. The operation of determining the heading direction of the mobile cleaning robot can include: measuring, from the image of the dock, a first distance between the detected first fiducial marker and the detected second fiducial marker, and a second distance between the detected first fiducial marker and the detected third fiducial marker; and determining the heading direction based on a comparison between the first distance and the second distance.

In Example 28, the subject matter of any one or more of Examples 23-27 optionally includes: receiving dock dimension information including actual positions of the second one or more fiducial markers relative to the first fiducial marker; and estimating positions of the second one or more fiducial markers using (1) a position of the detected first fiducial marker and (2) the actual positions of the second one or more fiducial markers relative to the first fiducial marker; wherein determining the heading direction is based on a comparison between the estimated positions of the second one or more fiducial markers and the detected positions of the second one or more fiducial markers.

In Example 29, the subject matter of any one or more of Examples 23-28 optionally includes the first fiducial marker that can include a polygonal retroreflective artificial tag, and the method can further include detecting a position of at least one corner of the polygonal retroreflective artificial tag, and determining the heading direction further using the detected position of the at least one corner of the polygonal retroreflective artificial tag.

In Example 30, the subject matter of any one or more of Examples 23-29 optionally includes receiving dock dimension information including an actual distance between two fiducial markers selected from the first and second one or more fiducial markers, and measuring, from the image of the dock, a distance between the two fiducial markers; wherein determining the heading direction is based on a difference between the measured distance and the actual distance between the two fiducial markers.

This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 4A is a diagram illustrating an example of a communication network in which a mobile cleaning robot operates and data transmission in the network.

DETAILED DESCRIPTION

Figure 1:
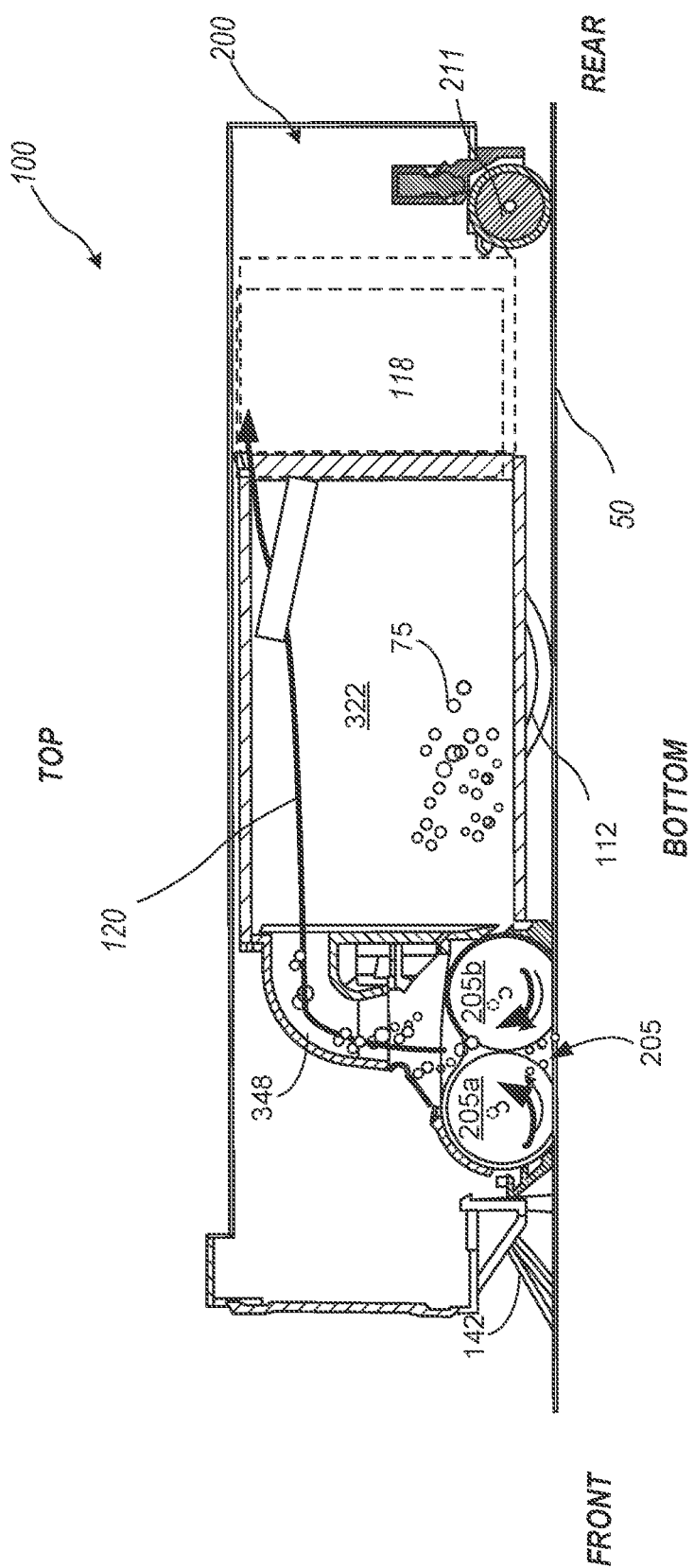
FIGS. 1, 2A, and 2B are side cross-sectional, bottom, and top perspective views of a mobile robot.

An autonomous mobile robot may be controlled locally or remotely to execute a mission, such as a cleaning mission involving rooms or floor surface areas to be cleaned by a mobile cleaning robot. A user may use a remote control device to display a map of the environment, create a cleaning mission on a user interface (UI) of the remote control device, control the mobile cleaning robot to execute the cleaning mission. The mobile cleaning robot may rest at a dock (also referred to as a docking station) while cleaning, such as after completing a cleaning mission. While at the dock, the mobile cleaning robot can charge its battery. Additionally, in some examples, the dock may include an evacuation unit to extract debris from the mobile robot. A mobile robot can detect the dock and navigate until docked.

During docking, it can be important that the mobile cleaning robot approaches the dock within a specific range of headings, such as to provide for proper alignment of charging contacts of the mobile cleaning robot with corresponding charging contacts on the dock. If the mobile cleaning robot does not approach the dock within the specified range of headings (that is, the mobile cleaning robot is misaligned with the dock during docking), the mobile cleaning robot may not charge properly. In examples where the dock includes an evacuation station to extract debris from the mobile cleaning robot, if the mobile cleaning robot is misaligned during docking, the evacuation intake on the dock may not be sealed properly with the mobile cleaning robot, which may cause air and debris leakage and reduce the extraction efficiency.

The present inventors have recognized an unmet need for an improved robot docking system that can detect, and timely correct, misalignment during docking, thereby improving docking accuracy and efficiency. The present inventors particularly recognized that it may be desirable to include a fiducial marker system with multiple non-coplanar fiducial markers disposed on the dock. Robot pose or heading direction estimation based on a signal fiducial marker, or multiple co-planer fiducial markers, may not be accurate, especially when the co-planer fiducial markers are close to each other and when the robot is farther away from dock (and thus the fiducial markers). The non-coplanar fiducial markers can form a three-dimensional (3D) fiducial system that, when used by the disclosed docking system and methods, can provide more accurate estimate of robot pose or heading direction with respect to the dock. The inventors have also recognized that it may be helpful to achieve the correct heading prior to the mobile cleaning robot making contact with the dock, as maneuvering the mobile cleaning robot can be constrained by the mechanical interactions between the dock and robot.

The mobile robots and the docking techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

In the following, mobile robot and its working environment are briefly discussed with reference to FIGS. 1-4B. Detailed descriptions of systems, devices, mobile applications, and methods of determining and adjusting robot pose or heading and planning docking in accordance with various embodiments described herein, are discussed with reference to FIGS. 5A to 12.

Examples of Autonomous Mobile Robots

Figure 2A:
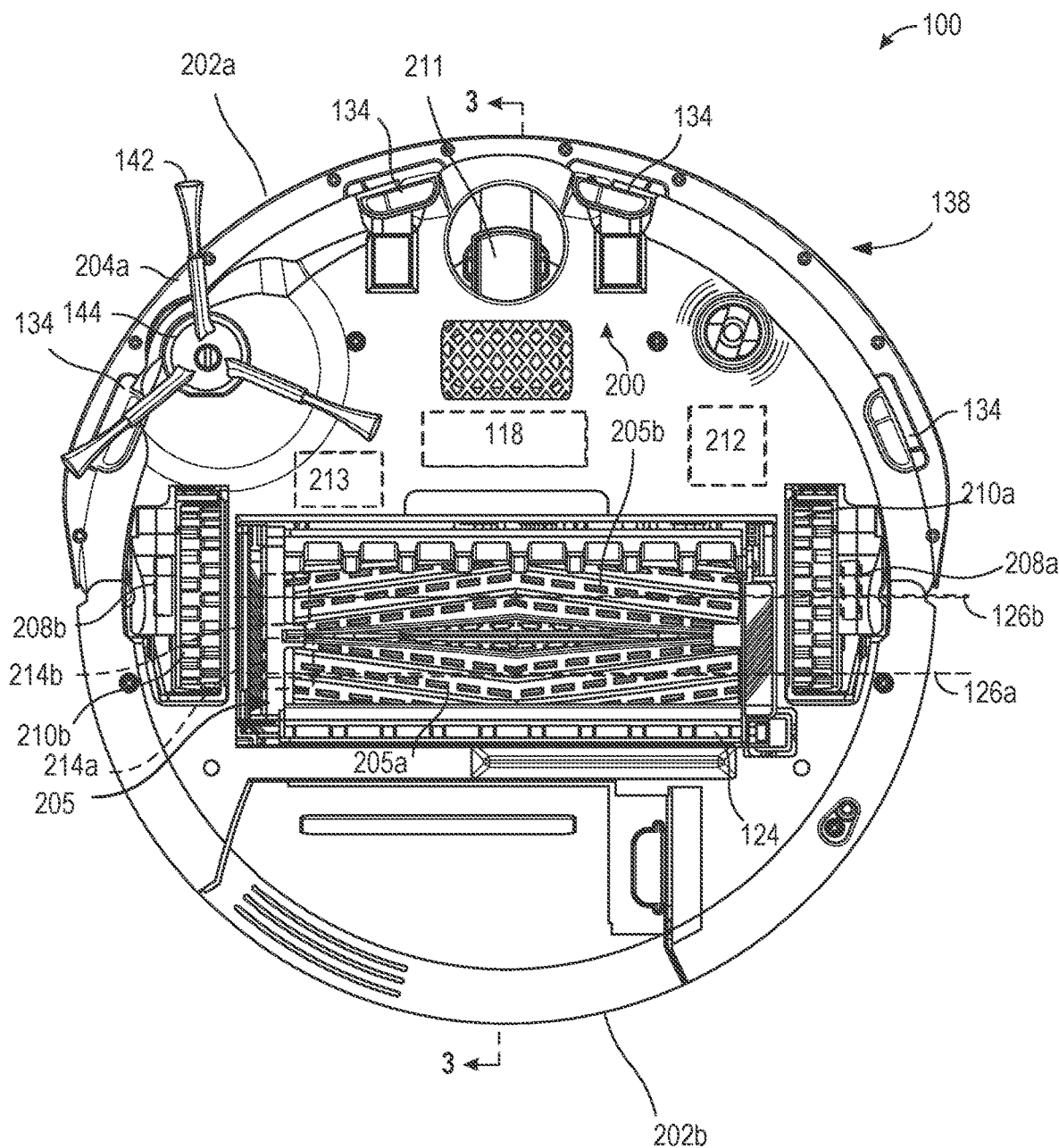
Figure 2B:
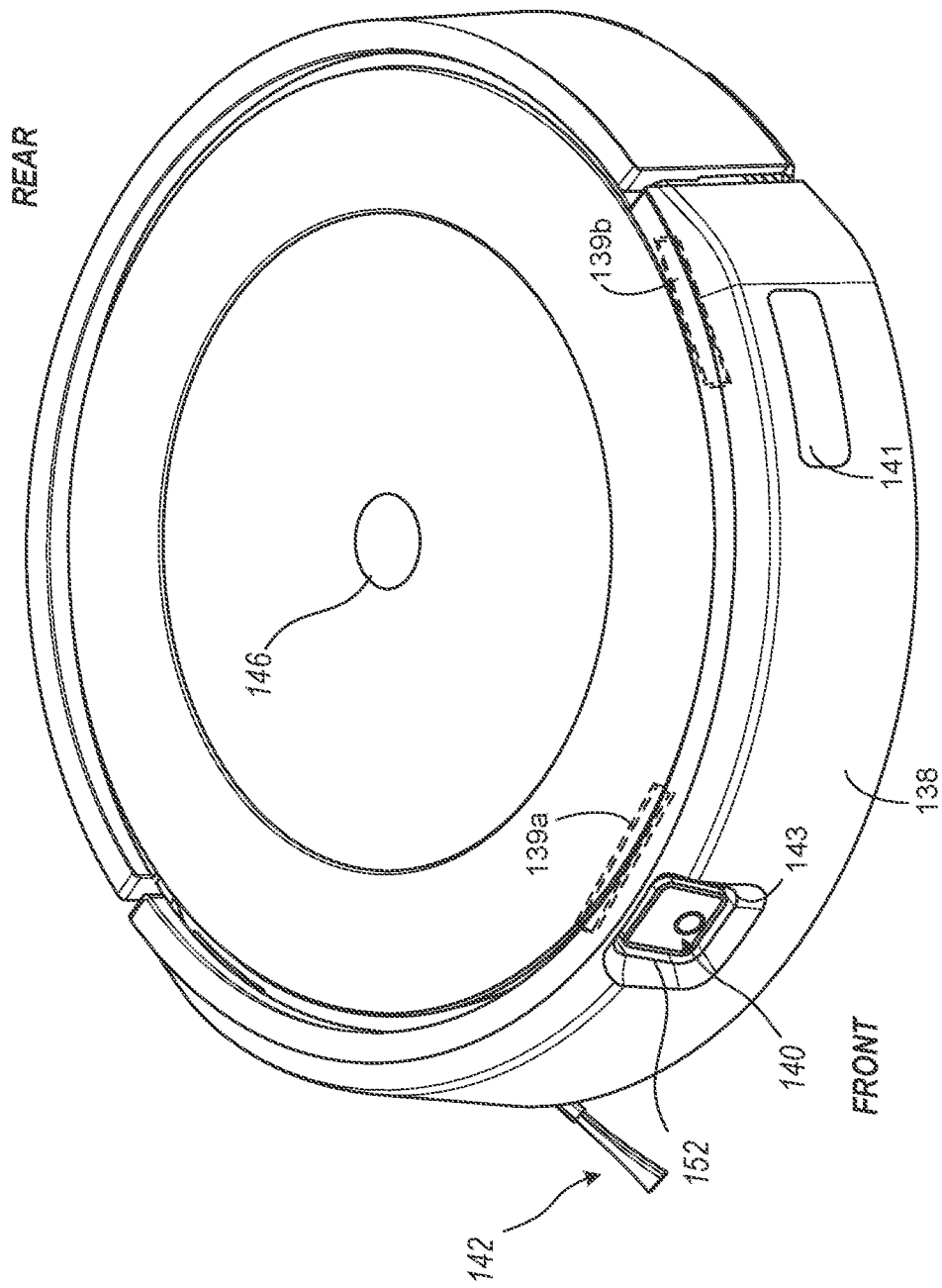
Figure 3:
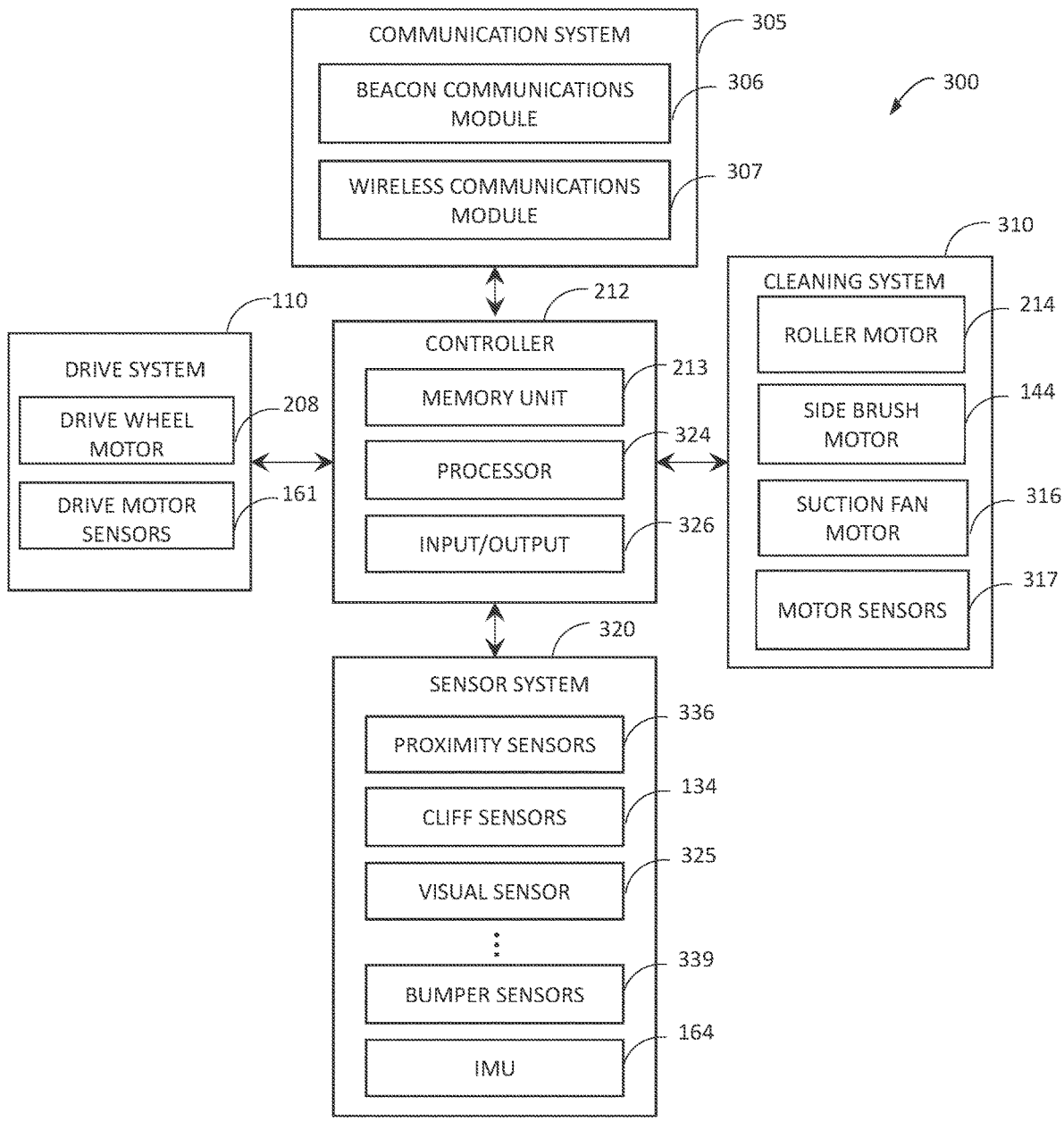
FIG. 3 is a diagram illustrating an example of a control architecture for operating a mobile cleaning robot.

FIGS. 1 and 2A-2B depict different views of an example of a mobile robot 100. FIG. 1 illustrates a cross-section view of the mobile cleaning robot 100. FIG. 2A illustrates a bottom view of the mobile cleaning robot 100. FIG. 2B illustrates a bottom view of the mobile cleaning robot 100. The cross-section view in FIG. 1 is obtained through the across indicators 3-3 of FIG. 2A of the mobile cleaning robot 100. FIG. 1 also shows orientation indicators Bottom, Top, Front, and Rear. FIGS. 2A-3 are discussed together below.

The cleaning robot 100 can be an autonomous cleaning robot that autonomously traverses the floor surface 50 while ingesting the debris 75 from different parts of the floor surface 50. As depicted in FIGS. 2A and 1, the robot 100 includes a body 200 movable across the floor surface 50. The body 200 can include multiple connected structures to which movable components of the cleaning robot 100 are mounted. The connected structures can include, for example, an outer housing to cover internal components of the cleaning robot 100, a chassis to which drive wheels 210a and 210b and the cleaning rollers 205a and 205b (of a cleaning head 205) are mounted, a bumper 138 mounted to the outer housing, etc.

As shown in FIG. 2A, the body 200 includes a front portion 202a that has a substantially semicircular shape and a rear portion 202b that has a substantially semicircular shape. As shown in FIG. 2A, the robot 100 can include a drive system including actuators 208a and 208b, e.g., motors, operable with drive wheels 210a and 210b. The actuators 208a and 208b can be mounted in the body 200 and can be operably connected to the drive wheels 210a and 210b, which are rotatably mounted to the body 200. The drive wheels 210a and 210b support the body 200 above the floor surface 50. The actuators 208a and 208b, when driven, can rotate the drive wheels 210a and 210b to enable the robot 100 to autonomously move across the floor surface 50.

The controller (or processor) 212 can be located within the housing and can be a programmable controller, such as a single or multi-board computer, a direct digital controller (DDC), a programmable logic controller (PLC), or the like. In other examples the controller 212 can be any computing device, such as a handheld computer, for example, a smart phone, a tablet, a laptop, a desktop computer, or any other computing device including a processor, memory, and communication capabilities. The memory 213 can be one or more types of memory, such as volatile or non-volatile memory, read-only memory (ROM), random-access memory (RAM), magnetic disk storage media, optical storage media, flash-memory devices, and other storage devices and media. The memory 213 can be located within the body 200, connected to the controller 212 and accessible by the controller 212.

The controller 212 can operate the actuators 208a and 208b to autonomously navigate the robot 100 about the floor surface 50 during a cleaning operation. The actuators 208a and 208b are operable to drive the robot 100 in a forward drive direction, in a backwards direction, and to turn the robot 100. The robot 100 can include a caster wheel 211 that supports the body 200 above the floor surface 50. The caster wheel 211 can support the rear portion 202b of the body 200 above the floor surface 50, and the drive wheels 210a and 210b support the front portion 202a of the body 200 above the floor surface 50.

As shown in FIG. 1, a vacuum assembly 118 can be carried within the body 200 of the robot 100, e.g., in the front portion 202a of the body 200. The controller 212 can operate the vacuum assembly 118 to generate an airflow that flows through the air gap near the cleaning rollers 205a and 205b, through the body 200, and out of the body 200. The vacuum assembly 118 can include, for example, an impeller that generates the airflow when rotated. The airflow and the cleaning rollers 205a and 205b, when rotated, cooperate to ingest debris 75 into the robot 100. A cleaning bin 322 mounted in the body 200 contains the debris 75 ingested by the robot 100, and a filter in the body 200 separates the debris 75 from the airflow before the airflow 120 enters the vacuum assembly 118 and is exhausted out of the body 200. In this regard, the debris 75 is captured in both the cleaning bin 322 and the filter before the airflow 120 is exhausted from the body 200.

The cleaning rollers 205a and 205b can operably connected to actuators 214a and 214b, e.g., motors, respectively. The cleaning head 205 and the cleaning rollers 205a and 205b can positioned forward of the cleaning bin 322. The cleaning rollers 205a and 205b can be mounted to a housing 124 of the cleaning head 205 and mounted, e.g., indirectly or directly, to the body 200 of the robot 100. In particular, the cleaning rollers 205a and 205b are mounted to an underside of the body 200 so that the cleaning rollers 205a and 205b engage debris 75 on the floor surface 50 during the cleaning operation when the underside faces the floor surface 50.

The housing 124 of the cleaning head 205 can be mounted to the body 200 of the robot 100. In this regard, the cleaning rollers 205a and 205b are also mounted to the body 200 of the robot 100, e.g., indirectly mounted to the body 200 through the housing 124. Alternatively, or additionally, the cleaning head 205 is a removable assembly of the robot 100 in which the housing 124 with the cleaning rollers 205a and 205b mounted therein is removably mounted to the body 200 of the robot 100. The housing 124 and the cleaning rollers 205a and 205b are removable from the body 200 as a unit so that the cleaning head 205 is easily interchangeable with a replacement cleaning head 205.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50.

Cliff sensors 134 (shown in FIG. 2A) can be located along a bottom portion of the body 200. Each of the cliff sensors 134 can be an optical sensor that can be configured to detect a presence or absence of an object below the optical sensor, such as the floor surface 50. The cliff sensors 134 can be connected to the controller 212. A bumper 138 can be removably secured to the body 200 and can be movable relative to body 200 while mounted thereto. In some examples, the bumper 138 form part of the body 200. The bumper sensors 139a and 139b (the bumper sensors 139) can be connected to the body 200 and engageable or configured to interact with the bumper 138. The bumper sensors 139 can include break beam sensors, capacitive sensors, switches, or other sensors that can detect contact between the robot 100, i.e., the bumper 138, and objects in the environment. The bumper sensors 139 can be in communication with the controller 212.

An image capture device 140 can be a camera connected to the body 200 and can extend through the bumper 138 of the robot 100, such as through an opening 143 of the bumper 138. The image capture device 140 can be a camera, such as a front-facing camera, configured to generate a signal based on imagery of the environment of the robot 100 as the robot 100 moves about the floor surface 50. The image capture device 140 can transmit the signal to the controller 212 for use for navigation and cleaning routines.

Obstacle following sensors 141 (shown in FIG. 2B) can include an optical sensor facing outward from the bumper 138 and that can be configured to detect the presence or the absence of an object adjacent to a side of the body 200. The obstacle following sensor 141 can emit an optical beam horizontally in a direction perpendicular (or nearly perpendicular) to the forward drive direction of the robot 100. The optical emitter can emit an optical beam outward from the robot 100, e.g., outward in a horizontal direction, and the optical detector detects a reflection of the optical beam that reflects off an object near the robot 100. The robot 100, e.g., using the controller 212, can determine a time of flight of the optical beam and thereby determine a distance between the optical detector and the object, and hence a distance between the robot 100 and the object.

A side brush 142 can be connected to an underside of the robot 100 and can be connected to a motor 144 operable to rotate the side brush 142 with respect to the body 200 of the robot 100. The side brush 142 can be configured to engage debris to move the debris toward the cleaning assembly 205 or away from edges of the environment. The motor 144 configured to drive the side brush 142 can be in communication with the controller 112. The brush 142 can rotate about a non-horizontal axis, e.g., an axis forming an angle between 75 degrees and 90 degrees with the floor surface 50. The non-horizontal axis, for example, can form an angle between 75 degrees and 90 degrees with the longitudinal axes 126a and 126b of the rollers 205a and 205b.

The brush 142 can be a side brush laterally offset from a center of the robot 100 such that the brush 142 can extend beyond an outer perimeter of the body 200 of the robot 100. Similarly, the brush 142 can also be forwardly offset of a center of the robot 100 such that the brush 142 also extends beyond the bumper 138.

The robot 100 can also include a button 146 (or interface) that can be a user-operable interface configured to provide commands to the robot, such as to pause a mission, power on, power off, or return to a docking station.

In operation of some examples, the robot 100 can be propelled in a forward drive direction or a rearward drive direction. The robot 100 can also be propelled such that the robot 100 turns in place or turns while moving in the forward drive direction or the rearward drive direction.

When the controller 212 causes the robot 100 to perform a mission, the controller 212 can operate the motors 208 to drive the drive wheels 210 and propel the robot 100 along the floor surface 50. In addition, the controller 212 can operate the motors 214 to cause the rollers 205a and 205b to rotate, can operate the motor 144 to cause the brush 142 to rotate, and can operate the motor of the vacuum assembly 118 to generate airflow. The controller 212 can execute software stored on the memory 213 to cause the robot 100 to perform various navigational and cleaning behaviors by operating the various motors of the robot 100.

The various sensors of the robot 100 can be used to help the robot navigate and clean within the environment. For example, the cliff sensors 134 can detect obstacles such as drop-offs and cliffs below portions of the robot 100 where the cliff sensors 134 are disposed. The cliff sensors 134 can transmit signals to the controller 212 so that the controller 212 can redirect the robot 100 based on signals from the cliff sensors 134.

In some examples, a bumper sensor 139a can be used to detect movement of the bumper 138 along a fore-aft axis of the robot 100. A bumper sensor 139b can also be used to detect movement of the bumper 138 along one or more sides of the robot 100. The bumper sensors 139 can transmit signals to the controller 212 so that the controller 212 can redirect the robot 100 based on signals from the bumper sensors 139.

The image capture device 140 can be configured to generate a signal based on imagery of the environment of the robot 100 as the robot 100 moves about the floor surface 50.

The image capture device 140 can transmit such a signal to the controller 212. The image capture device 140 can be angled in an upward direction, e.g., angled between 5 degrees and 45 degrees from the floor surface 50 about which the robot 100 navigates. The image capture device 140, when angled upward, can capture images of wall surfaces of the environment so that features corresponding to objects on the wall surfaces can be used for localization.

In some examples, the obstacle following sensors 141 can detect detectable objects, including obstacles such as furniture, walls, persons, and other objects in the environment of the robot 100. In some implementations, the sensor system can include an obstacle following sensor along a side surface, and the obstacle following sensor can detect the presence or the absence an object adjacent to the side surface. The one or more obstacle following sensors 141 can also serve as obstacle detection sensors, similar to the proximity sensors described herein.

The robot 100 can also include sensors for tracking a distance travelled by the robot 100. For example, the sensor system can include encoders associated with the motors 208 for the drive wheels 210, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 212 can use data collected by the sensors of the sensor system to control navigational behaviors of the robot 100 during the mission. For example, the controller 212 can use the sensor data collected by obstacle detection sensors of the robot 100, (the cliff sensors 134, the bumper sensors 139, and the image capture device 140) to enable the robot 100 to avoid obstacles within the environment of the robot 100 during the mission.

The sensor data can also be used by the controller 212 for simultaneous localization and mapping (SLAM) techniques in which the controller 212 extracts features of the environment represented by the sensor data and constructs a map of the floor surface 50 of the environment. The sensor data collected by the image capture device 140 can be used for techniques such as vision-based SLAM (VSLAM) in which the controller 212 extracts visual features corresponding to objects in the environment and constructs the map using these visual features. As the controller 212 directs the robot 100 about the floor surface 50 during the mission, the controller 212 can use SLAM techniques to determine a location of the robot 100 within the map by detecting features represented in collected sensor data and comparing the features to previously stored features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory 213. In addition, other data generated for the SLAM techniques, including mapping data forming the map, can be stored in the memory 213. These data produced during the mission can include persistent data that are produced during the mission and that are usable during further missions. In addition to storing the software for causing the robot 100 to perform its behaviors, the memory 213 can store data resulting from processing of the sensor data for access by the controller 212. For example, the map can be a map that is usable and updateable by the controller 212 of the robot 100 from one mission to another mission to navigate the robot 100 about the floor surface 50.

The persistent data, including the persistent map, helps to enable the robot 100 to efficiently clean the floor surface 50. For example, the map enables the controller 212 to direct the robot 100 toward open floor space and to avoid non-traversable space. In addition, for subsequent missions, the controller 212 can use the map to optimize paths taken during the missions to help plan navigation of the robot 100 through the environment.

FIG. 3 is a diagram illustrating an example of a control architecture 300 for operating a mobile cleaning robot. The controller 212 can be communicatively coupled to various subsystems of the mobile robot 100, including a communications system 305, a cleaning system 310, a drive system 110, and a sensor system 320. The controller 212 includes a memory 213 that holds data and instructions for processing by a processor 324. The processor 324 receives program instructions and feedback data from the memory 213, executes logical operations called for by the program instructions, and generates command signals for operating the respective subsystem components of the mobile robot 100. An input/output unit 326 transmits the command signals and receives feedback from the various illustrated components.

The communications system 305 can include a beacon communications module 306 and a wireless communications module 307. The beacon communications module 306 may be communicatively coupled to the controller 212. In some embodiments, the beacon communications module 306 is operable to send and receive signals to and from a remote device. For example, the beacon communications module 306 may detect a navigation signal projected from an emitter of a navigation or virtual wall beacon or a homing signal projected from the emitter of a dock. Docking, confinement, home base, and homing technologies are discussed in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 facilitates the communication of information describing a status of the mobile robot 100 over a suitable wireless network (e.g., a wireless local area network) with one or more mobile devices (e.g., mobile device 404 shown in FIG. 4A). More details of the communications system 305 are discussed below, such as with reference to FIG. 4A.

The cleaning system 310 can include the roller motor 214 (e.g., actuators 214a and 214b), a brush motor 144 driving the side brush 142, and a suction fan motor 316 powering the vacuum assembly 118. The cleaning system 310 further includes multiple motor sensors 317 that monitor operation of the roller motor 214, the brush motor 144, and the suction fan motor 316 to facilitate closed-loop control of the motors by the controller 212. In some embodiments, the roller motor 214 is operated by the controller 212 (or a suitable microcontroller) to drive the rollers (e.g., rollers 205s and 205b) according to a particular speed setting via a closed-loop pulse-width modulation (PWM) technique, where the feedback signal is received from a motor sensor 317 monitoring a signal indicative of the rotational speed of the roller motor 214. For example, such a motor sensor 317 may be provided in the form of a motor current sensor (e.g., a shunt resistor, a current-sensing transformer, and/or a Hall Effect current sensor).

The drive system 110 can include a drive-wheel motor 208 for operating the drive wheels 210 in response to drive commands or control signals from the controller 212, as well as multiple drive motor sensors 161 to facilitate closed-loop control of the drive wheels (e.g., via a suitable PWM technique as described above). In some implementations, a microcontroller assigned to the drive system 110 is configured to decipher drive commands having x, y, and θ components. The controller 212 may issue individual control signals to the drive-wheel motor 208. In any event, the controller 212 can maneuver the mobile robot 100 in any direction across a cleaning surface by independently controlling the rotational speed and direction of each drive wheel 212a or 210b via the drive-wheel motor 208.

The controller 212 can operate the drive system 110 in response to signals received from the sensor system 320. For example, the controller 212 may operate the drive system 110 to redirect the mobile robot 100 to avoid obstacles encountered while treating a floor surface. In another example, if the mobile robot 100 becomes stuck or entangled during use, the controller 212 may operate the drive system 110 according to one or more escape behaviors. To achieve reliable autonomous movement, the sensor system 320 may include several different types of sensors that can be used in combination with one another to allow the mobile robot 100 to make intelligent decisions about a particular environment. By way of example and not limitation, the sensor system 320 can include one or more of proximity sensors 336, the cliff sensors 134, a visual sensor 325 such as the image capture device 140 configured for detecting features and landmarks in the operating environment and building a virtual map, such as using VSLAM technology, as described above.

The sensor system 320 may further include bump sensors 339 (such as the bump sensors 139a and 139b), responsive to activation of the bumper 138. The sensor system 320 can include an inertial measurement unit (IMU) 164 that is, in part, responsive to changes in position of the mobile robot 100 with respect to a vertical axis substantially perpendicular to the floor and senses when the mobile robot 100 is pitched at a floor type interface having a difference in height, which is potentially attributable to a flooring type change. In some examples, the IMU 164 is a six-axis IMU having a gyro sensor that measures the angular velocity of the mobile robot 100 relative to the vertical axis. However, other suitable configurations are also contemplated. For example, the IMU 164 may include an accelerometer sensitive to the linear acceleration of the mobile robot 100 along the vertical axis. In any event, output from the IMU 164 is received by the controller 212 and processed to detect a discontinuity in the floor surface across which the mobile robot 100 is traveling. Within the context of the present disclosure the terms "flooring discontinuity" and "threshold" refer to any irregularity in the floor surface (e.g., a change in flooring type or change in elevation at a flooring interface) that is traversable by the mobile robot 100, but that causes a discrete vertical movement event (e.g., an upward or downward "bump"). The vertical movement event could refer to a part of the drive system (e.g., one of the drive wheels 210) or the chassis of the body 200, depending on the configuration and placement of the IMU 164. Detection of a flooring threshold, or flooring interface, may prompt the controller 212 to expect a change in floor type. For example, the mobile robot 100 may experience a significant downward vertical bump as it moves from high pile carpet (a soft floor surface) to a tile floor (a hard floor surface), and an upward bump in the opposite case.

A wide variety of other types of sensors, though not shown or described in connection with the illustrated examples, may be incorporated in the sensor system 320 (or any other subsystem) without departing from the scope of the present disclosure. Such sensors may function as obstacle detection units, obstacle detection obstacle avoidance (ODOA) sensors, wheel drop sensors, obstacle-following sensors, stall-sensor units, drive-wheel encoder units, bump sensors, and the like.

Examples of Communication Networks

FIG. 4A is a diagram illustrating by way of example and not limitation a communication network 400A that enables networking between the mobile robot 100 and one or more other devices, such as a mobile device 404, a cloud computing system 406, or another autonomous robot 408 separate from the mobile device 404. Using the communication network 400A, the mobile robot 100, the mobile device 404, the robot 408, and the cloud computing system 406 can communicate with one another to transmit data to one another and receive data from one another. In some implementations, the mobile robot 100, the robot 408, or both the mobile robot 100 and the robot 408 communicate with the mobile device 404 through the cloud computing system 406. Alternatively or additionally, the mobile robot 100, the robot 408, or both the mobile robot 100 and the robot 408 communicate directly with the mobile device 404. Various types and combinations of wireless networks (e.g., Bluetooth, radio frequency, optical based, etc.) and network architectures (e.g., mesh networks) may be employed by the communication network 400A.

In some implementations, the mobile device 404 as shown in FIG. 4A is a remote device that can be linked to the cloud computing system 406, and can enable a user to provide inputs on the mobile device 404. The mobile device 404 can include user input elements such as, for example, one or more of a touchscreen display, buttons, a microphone, a mouse, a keyboard, or other devices that respond to inputs provided by the user. The mobile device 404 alternatively or additionally includes immersive media (e.g., virtual reality) with which the user interacts to provide a user input. The mobile device 404, in these cases, is, for example, a virtual reality headset or a head-mounted display. The user can provide inputs corresponding to commands for the mobile device 404. In such cases, the mobile device 404 transmits a signal to the cloud computing system 406 to cause the cloud computing system 406 to transmit a command signal to the mobile robot 100. In some implementations, the mobile device 404 can present augmented reality images. In some implementations, the mobile device 404 is a smart phone, a laptop computer, a tablet computing device, or other mobile device.

According to various embodiments discussed herein, the mobile device 404 may include a user interface configured to display a map of the robot environment. Robot path, such as that identified by the coverage planner of the controller 212, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 400A can include additional nodes. For example, nodes of the communication network 400A can include additional robots. Alternatively or additionally, nodes of the communication network 400A can include network-connected devices. In some implementations, a network-connected device can generate information about the environment. The network-connected device can include one or more sensors to detect features in the environment, such as an acoustic sensor, an image capture system, or other sensor generating signals from which features can be extracted. Network-connected devices can include home cameras, smart sensors, smart locks, smart thermostats, smart garage door openers, and the like.

In the communication network 400A depicted in FIG. 4A and in other implementations of the communication network 400A, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1 G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (TMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Figure 4B:
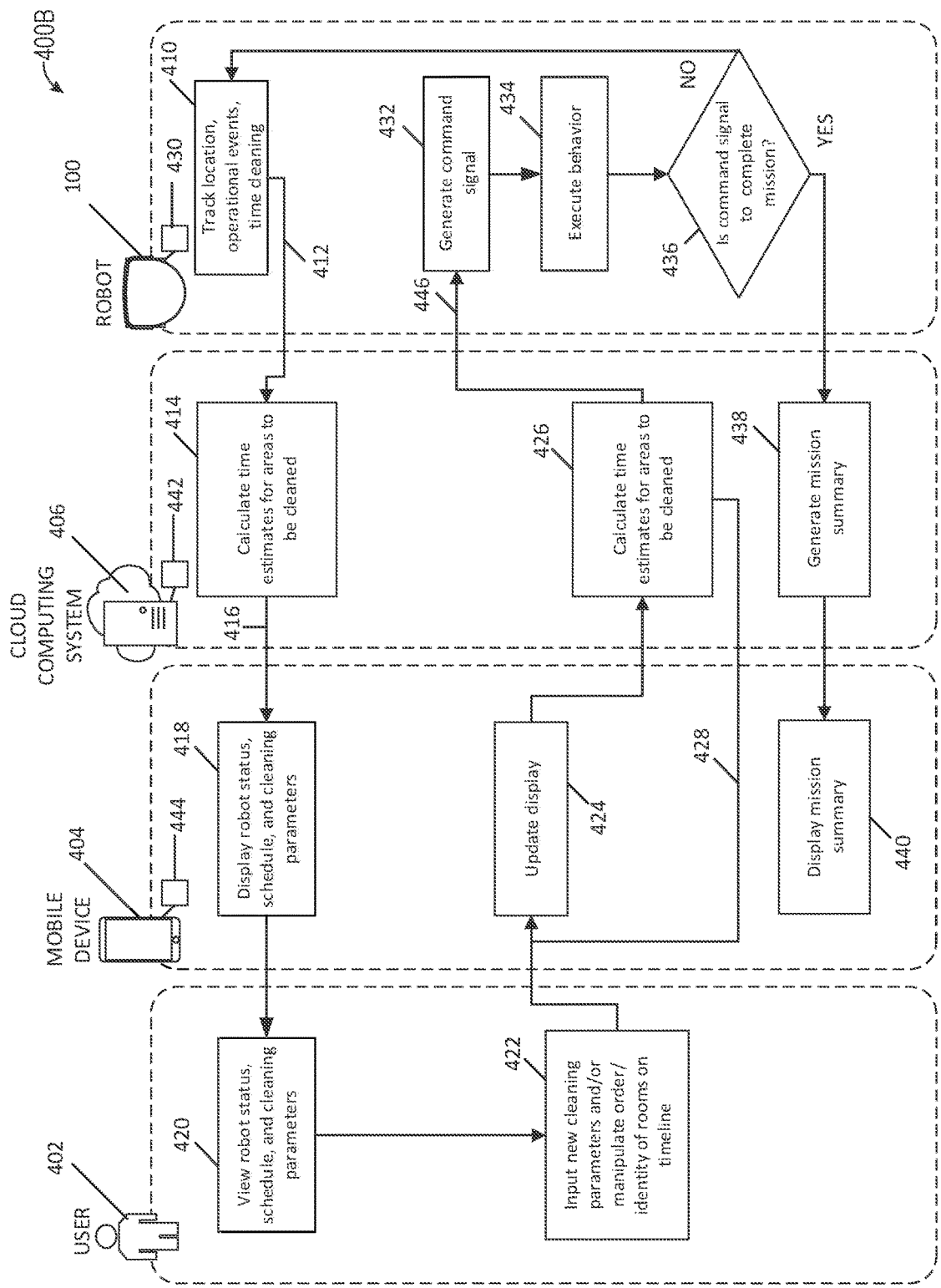
FIG. 4B is a diagram illustrating an exemplary process of exchanging information between the mobile robot and other devices in a communication network.

FIG. 4B is a diagram illustrating an exemplary process 400B of exchanging information among devices in the communication network 400A, including the mobile robot 100, the cloud computing system 406, and the mobile device 404. A cleaning mission may be initiated by pressing a button on the mobile robot 100 or may be scheduled for a future time or day. The user may select a set of rooms to be cleaned during the cleaning mission, select a set of areas or zones within a room, or may instruct the robot to clean all rooms. The user may also select a set of cleaning parameters to be used in each room during the cleaning mission.

During a cleaning mission, the mobile robot 100 tracks 410 its status, including its location, any operational events occurring during cleaning, and a time spent cleaning. The mobile robot 100 transmits 412 status data (e.g. one or more of location data, operational event data, time data) to a cloud computing system 406, which calculates 414, by a processor 442, time estimates for areas to be cleaned. For example, a time estimate could be calculated for a cleaning room by averaging the actual cleaning times for the room that have been gathered during multiple (e.g. two or more) prior cleaning missions for the room. The cloud computing system 406 transmits 416 time estimate data along with robot status data to a mobile device 404. The mobile device 404 presents 418, by a processor 444, the robot status data and time estimate data on a display. The robot status data and time estimate data may be presented on the display of the mobile device as any of a number of graphical representations editable mission timeline and/or a mapping interface.

In some examples, the mobile robot 100 can communicate directly with the mobile device 404.

A user 402 views 420 the robot status data and time estimate data on the display and may input 422 new cleaning parameters or may manipulate the order or identity of rooms to be cleaned. The user 402, may, for example, delete rooms from a cleaning schedule of the mobile robot 100. In other instances, the user 402, may, for example, select an edge cleaning mode or a deep clean mode for a room to be cleaned. The display of the mobile device 404 is updates 424 as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 calculates 426 time estimates for areas to be cleaned, which are then transmitted 428 (e.g. by a wireless transmission, by applying a protocol, by broadcasting a wireless transmission) back to the mobile device 404 and displayed. Additionally, data relating to the calculated time estimates are transmitted 446 to a controller 430 of the robot. Based on the inputs from the user 402, which are received by the controller 430 of the mobile robot 100, the controller 430 generates 432 a command signal. The command signal commands the mobile robot 100 to execute 434 a behavior, which may be a cleaning behavior. As the cleaning behavior is executed, the controller continues to track 410 the robot's status, including its location, any operational events occurring during cleaning, and a time spent cleaning. In some instances, live updates relating to the robot's status may be additionally provided via push notifications to a mobile device or home electronic system (e.g. an interactive speaker system).

Upon executing 434 a behavior, the controller 430 checks 436 to see if the received command signal includes a command to complete the cleaning mission. If the command signal includes a command to complete the cleaning mission, the robot is commanded to return to the dock and, upon return sends information to enable the cloud computing system 406 to generate 438 a mission summary which is transmitted to, and displayed 440 by, the mobile device 404. The mission summary may include a timeline and/or a map. The timeline may display, the rooms cleaned, a time spent cleaning each room, operational events tracked in each room, etc. The map may display the rooms cleaned, operational events tracked in each room, a type of cleaning (e.g. sweeping or mopping) performed in each room, etc.

Operations for the process 400B and other processes described herein can be executed in a distributed manner. For example, the cloud computing system 406, the mobile robot 100, and the mobile device 404 may execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Examples of Dock with Multiple Fiducial Markers for Robot Docking

Discussed in the following with reference to FIGS. 5-11 are various embodiments of docks and/or docking systems for automatically docking a mobile robot using multiple visual fiducial markers disposed at different locations on the dock. While this document makes reference to the mobile robot 100 that performs floor cleaning, the docking validation system and methods discussed herein can be used in robots designed for different applications, such as mopping, mowing, transporting, surveillance, among others. Additionally, while some components, modules, and operations may be described as being implemented in and performed by the mobile robot 100, by a user, by a computing device, or by another actor, these operations may, in some implementations, be performed by actors other than those described. For example, an operation performed by the mobile robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the mobile robot 100. In some implementations, the mobile robot 100 can perform, in addition to the operations described as being performed by the mobile robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations may be omitted, or additional operations or sub-operations may be added.

Figure 5A:
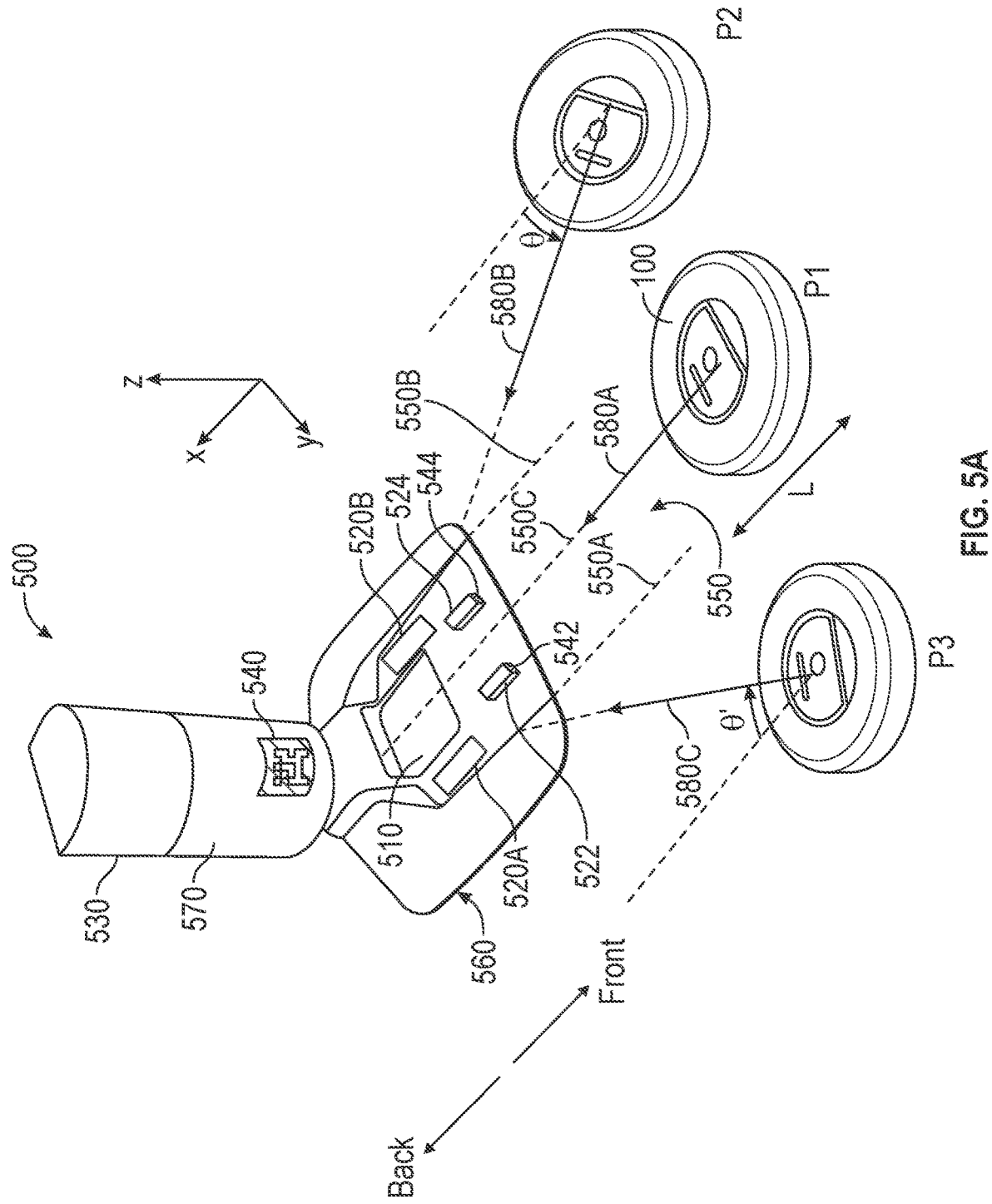
FIGS. 5A-5B illustrate an example of a mobile robot system for docking a mobile robot to a dock.
Figure 5B:
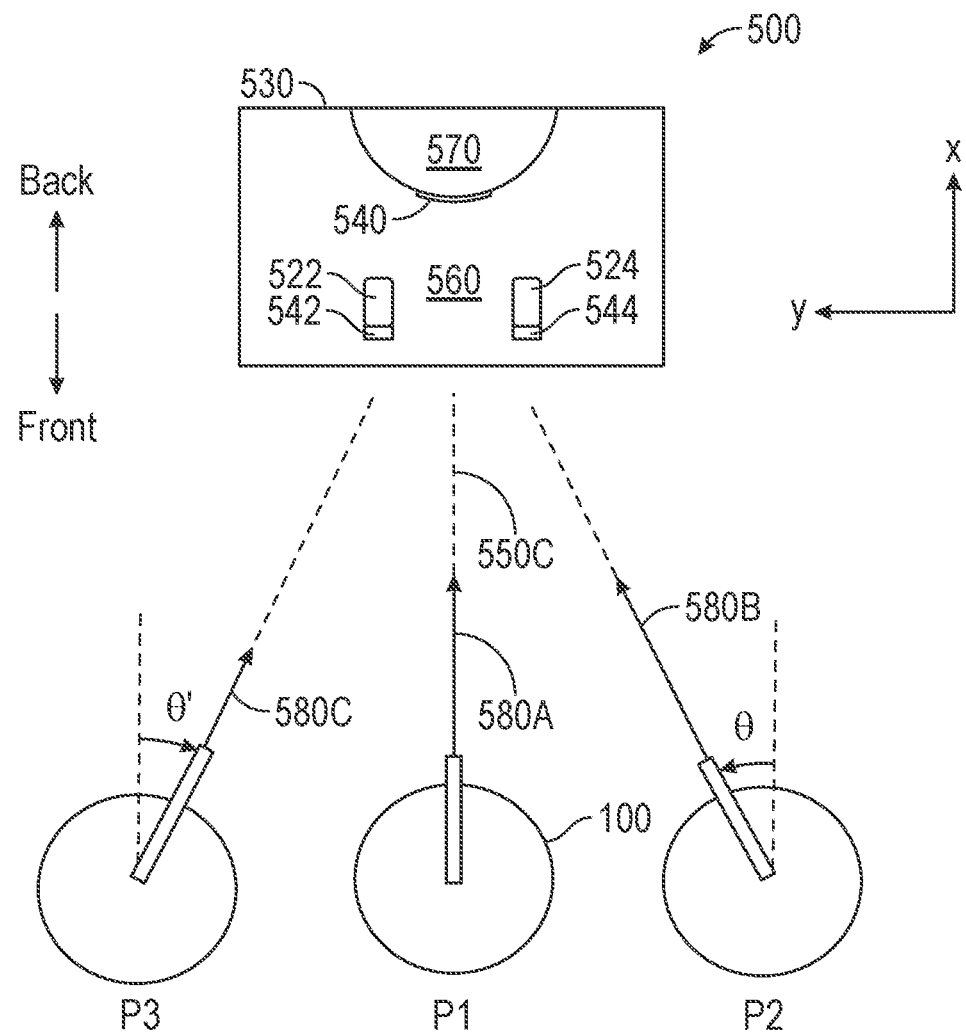

FIGS. 5A-5B illustrate an example of a mobile robot system for docking a mobile robot to a dock, comprising a dock 500 and a mobile robot 100. FIG. 5A shows an isometric view of the mobile robot system in an x-y-z coordinate system, and FIG. 5B shows a top view of the mobile robot system in an x-y plane. The dock 500 may include, or be connected to, a power supply. The dock 500 may include, on a docking port 560, charging contacts 522 and 524 electrically coupled to a charging system that can charge a battery of the mobile robot 100 when the mobile robot 100 is docked on the dock 500. In some examples, the dock 500 may be an evacuation station that includes a receptacle 570 to extract debris from the mobile robot 100. The dock 500 may be connected, wired or wirelessly, to a communication network, such as the cloud computing system 406, to enable or facilitate data transmission with the mobile robot 100 and/or the mobile device 404.

The dock 500 may include one or more distinct and distinguishable fiducial markers. The fiducial markers may have a predetermined spatial relationship relative to one another and/or with respect to a reference landmark on the dock 500. The fiducial markers may be any feature that is configured to be used for pose detection. For example, at least one of the fiducial markers may be a photogrammetry target, a light such as an LED, a reflective target, a spatially recognizable pattern, a bar code, a QR code, a logo, or an April Tag, among others. By way of non-limiting example, the dock 500 includes a first fiducial marker 540 (also referred to as a primary fiducial marker) disposed on a front plane of the dock 500, and second one or more fiducial markers (also referred to as secondary fiducial markers). The first fiducial marker 540 can be an artificial tag positioned on an exterior surface of the receptacle 570. The second one or more fiducial markers can be located at a different plane than the exterior surface of the receptable, such as a plane non-coplanar with the exterior surface. Although two secondary fiducial markers 542 and 544 are shown in FIGS. 5A and 5B, this is by way of example and not limitation. In other examples, any number of secondary fiducial markers may be included in the dock 500, such as only one secondary fiducial marker in one example, or three or more secondary fiducial markers in another example.

The first fiducial marker 540 can be offset along the x-axis from a back plane 530 of the dock 500 by a first distance, and the secondary fiducial markers 542 and 544 can each be offset along the x-axis from the back plane 530 by a second distance different from the first distance. In the example shown in FIGS. 5A and 5B, the secondary fiducial markers 542 and 544 are each attached to, or placed in proximity to, respective charging contacts 522 and 524. The secondary fiducial markers 542 and 544 are offset from the back plane 530 by a second distance greater than the first distance, such that the fiducial marker 540 is behind the fiducial markers 542 and 544 along the x-axis. In another example (not shown), the fiducial markers 542 and 544 can both be located on the back plane 530, or offset from the back plane 530 by a shorter distance than the first distance, such that the fiducial markers 542 and 544 are behind the fiducial marker 540 along the x-axis. When the fiducial markers 542 and 544 are positioned on the back plane 530, a portion of the dock, such as a portion of the receptacle 570, can be transparent, such that when the mobile robot 100 is in front of the dock 500 (as shown in FIGS. 5A and 5B), the fiducial markers 542 and 544 can be within the field of view of a visual system (e.g., a camera, the image capture device 140, or other visual imaging sensor) of the mobile robot without obstruction.

The secondary fiducial markers 542 and 544 can be laterally offset from the first fiducial marker 540 along the y-axis. As illustrated in FIGS. 5A and 5B, the fiducial marker 542 is offset from the first fiducial marker 540 in a first lateral direction (positive y-axis), and the fiducial marker offset from the first fiducial marker in a second lateral direction (negative y-axis) opposite the first lateral direction. Such spatial arrangement of the fiducial markers 540, 542, and 544 forms a three-dimensional (3D) fiducial marker system on the dock, which can help improve accuracy of determining the robot pose (e.g., a position and/or orientation) or heading direction with respect to the dock.

The visual system of the mobile robot 100 can generate an image of the dock, detect the fiducial markers from the image of the dock, recognize the dock 500 and determine a heading direction of the mobile robot 100 based on the detected fiducial markers. In some examples, the mobile robot 100 may map out a docking path from the current location of the mobile robot 100 to the dock 500 based on the present heading of the mobile robot 100. The docking path may be used to provide instructions to a driving system of the mobile robot 100 to maneuver the mobile robot 100 to the dock 500, such that the mobile robot 100 may connect with locks, clamps or detents 520A and 520B, or with the charging contacts 522 and 524 of the docking port 560 to charge a battery. In some examples, the docking path may be used to provide instructions to the driving system to maneuver the mobile robot 100 to align its air path with an evacuation collar 510 on the dock 500, such that the dock can extract debris from the mobile robot 100 into the receptacle 570. The evacuation collar 510 (or mating collar) may be positioned such that the mobile robot 100 can be positioned above the evacuation collar 510.

In some examples, when the time comes for recharging and/or evacuating debris, the mobile robot 100 can determine the location of the dock 500 on a map created by the mobile robot 100 or stored therein, and navigate to the docking area about the dock 500. From there, the mobile robot 100 may determine its pose or heading direction with respect to the dock 500, and plan a docking path to the dock 500. As illustrated in FIGS. 5A and 5B, the mobile robot 100 may move in a forward direction along a docking lane 550 to the dock 500. The docking lane 550 may be bounded by outside edges 550A and 550B, and has a central axis 550C aligned with the central axis of the docking port 560 into which the mobile robot 100 drives. The central axis 550C of the docking lane 550 is substantially normal to the back plane 530 of the dock 500. By approaching the dock 500 within the outside edges 550A and 550B, the mobile robot 100 may properly align its contacts with the charging contacts 522 and 524, align its wheels with the dock detents 520A and 520B, and/or align the robot air path with the evacuation collar 510 of the dock 500.

To ensure proper alignment during docking, it is desirable that the heading of the mobile robot 100 be substantially normal to the back plane 530 of the dock 500 (within an acceptable tolerance, e.g., +/−1 degree), such that the mobile robot 100 can move toward the dock 500 along the docking lane 550. For the purpose of illustration, different robot poses or heading directions are illustrated in FIGS. 5A and 5B. At a first pose P1, the mobile robot 100 has a first heading direction 580A substantially normal to a back plane 530 of the dock 500, and pointing toward the center of the dock (corresponding to the position of the first fiducial marker 540). At a second pose P2, the mobile robot 100 has a second heading direction 580B offset from the first heading direction 580A by an angle θ. At a third pose P3, the mobile robot 100 has a third heading direction 580C offset from the first heading direction 580A by an angle θ'. If the offset angles θ or θ' fall outside a tolerance range (e.g., +/−1 degree of normal to the back plane) and the mobile robot 100 moves along that direction, misaligned may occur, causing improper charging of the battery of the mobile robot 100 and/or sealing anomaly between the mobile robot 100 and the evacuation intake on the dock 500.

Figure 8:
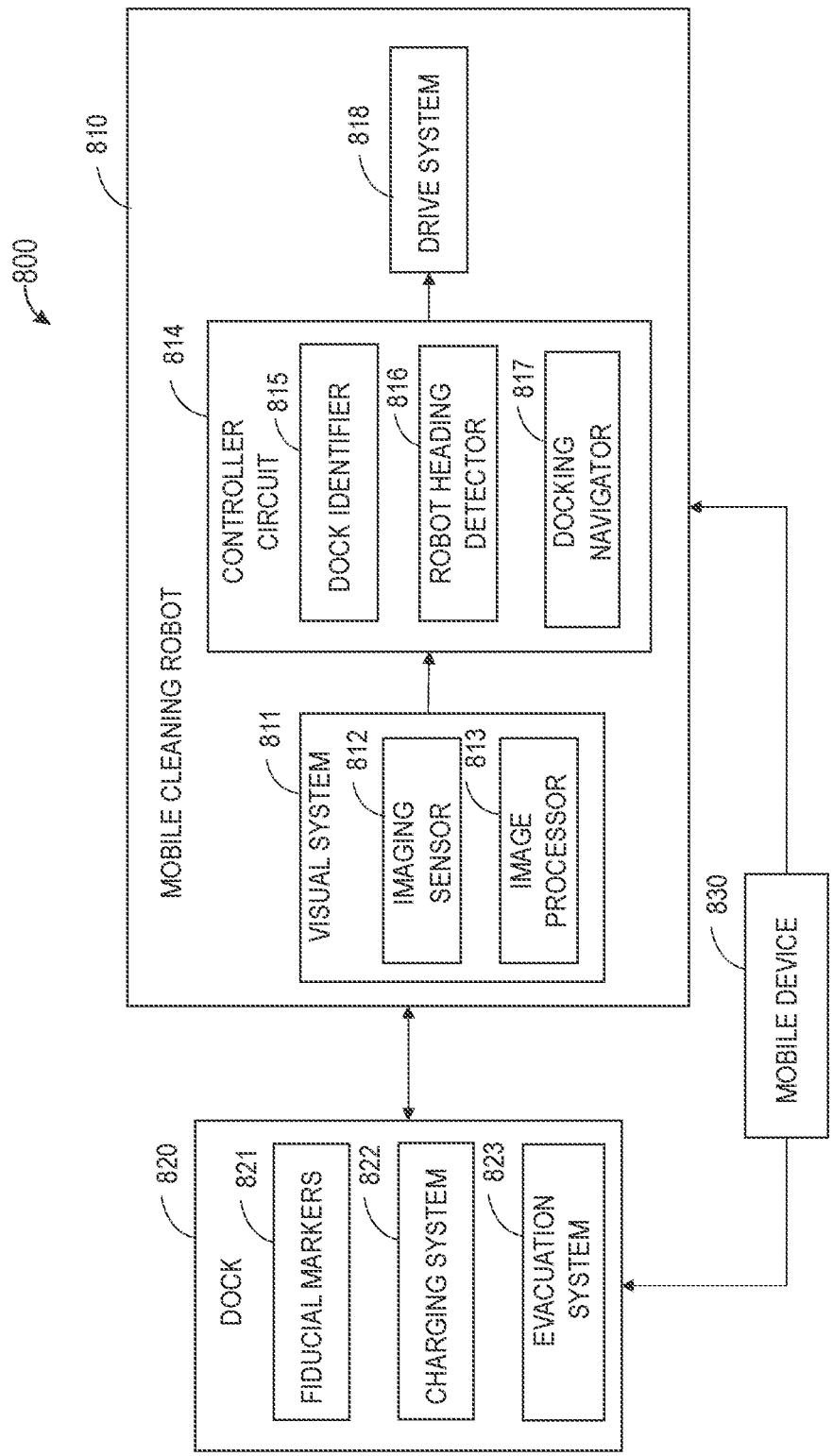
FIG. 8 is a block diagram illustrating an example of a mobile robot docking system for docking a mobile cleaning robot using visual fiducial markers disposed at different locations on the dock.
Figure 9:
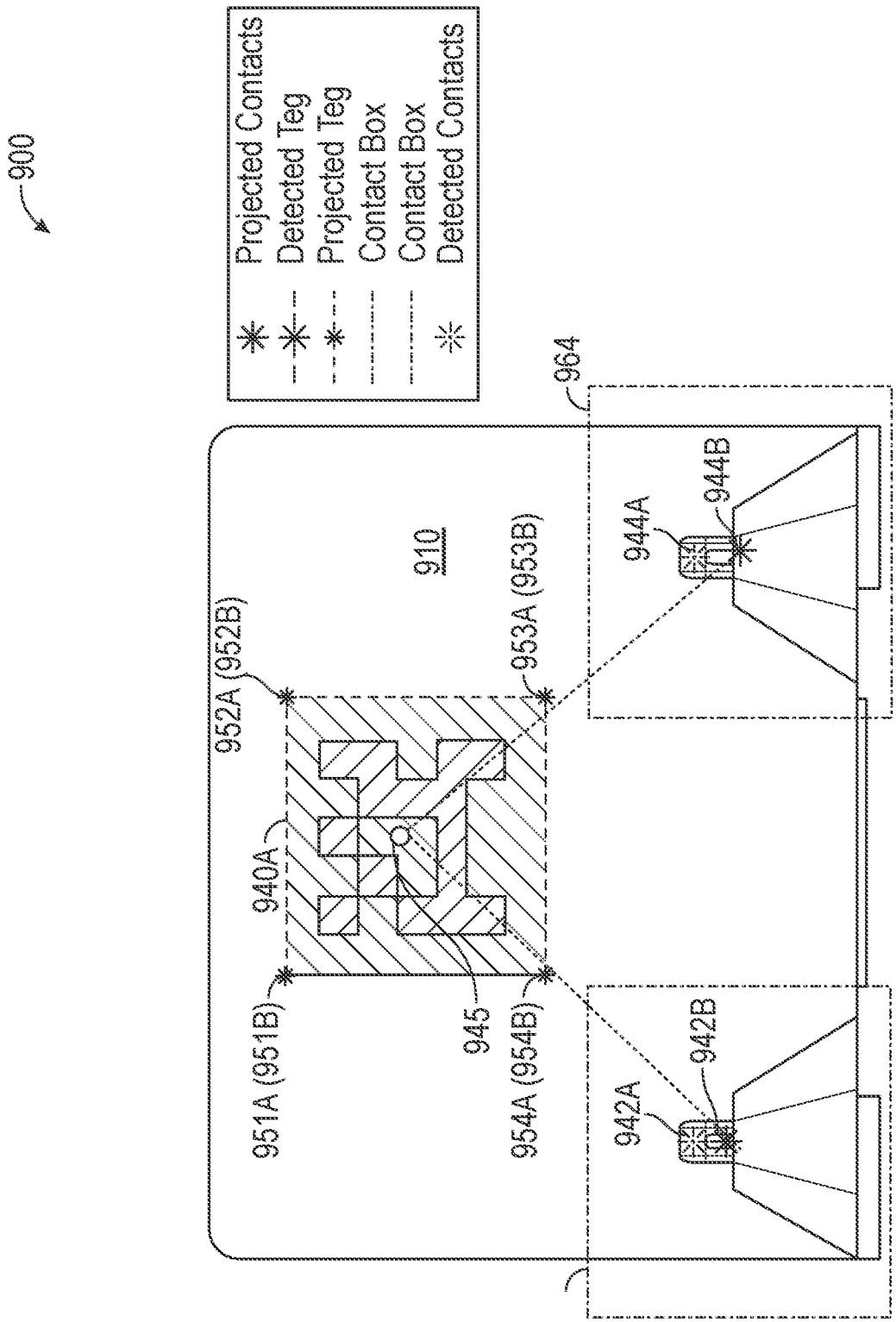
FIG. 9 is a diagram illustrate an example of determining robot heading direction based on an estimated position of a fiducial marker using dock dimension information.

In accordance with various examples described in this document such as with reference to FIGS. 8 and 9, the mobile robot 100 can determine its pose or heading direction relative to the dock 500 using positions of the first fiducial marker 540 and the one or more secondary fiducial markers 542 and/or 544 detected from an image of the dock. The mobile robot 100 can adjust its pose and heading direction before the mobile robot 100 reaches the docking port 560 or enters a minimum allowable distance from the docking port 560 (e.g., 15-20 cm, as determined by the constraint of mechanical interactions between the dock 500 and the mobile robot 100). The adjustment of pose or heading direction can be achieved using a feedback controller, such as a Proportional-Integral (PI) controller or a Proportional-Integral-Derivative (PID) controller. The adjustment can be continued until the offset angle θ falls within a tolerance offset angle range.

Figure 6A:
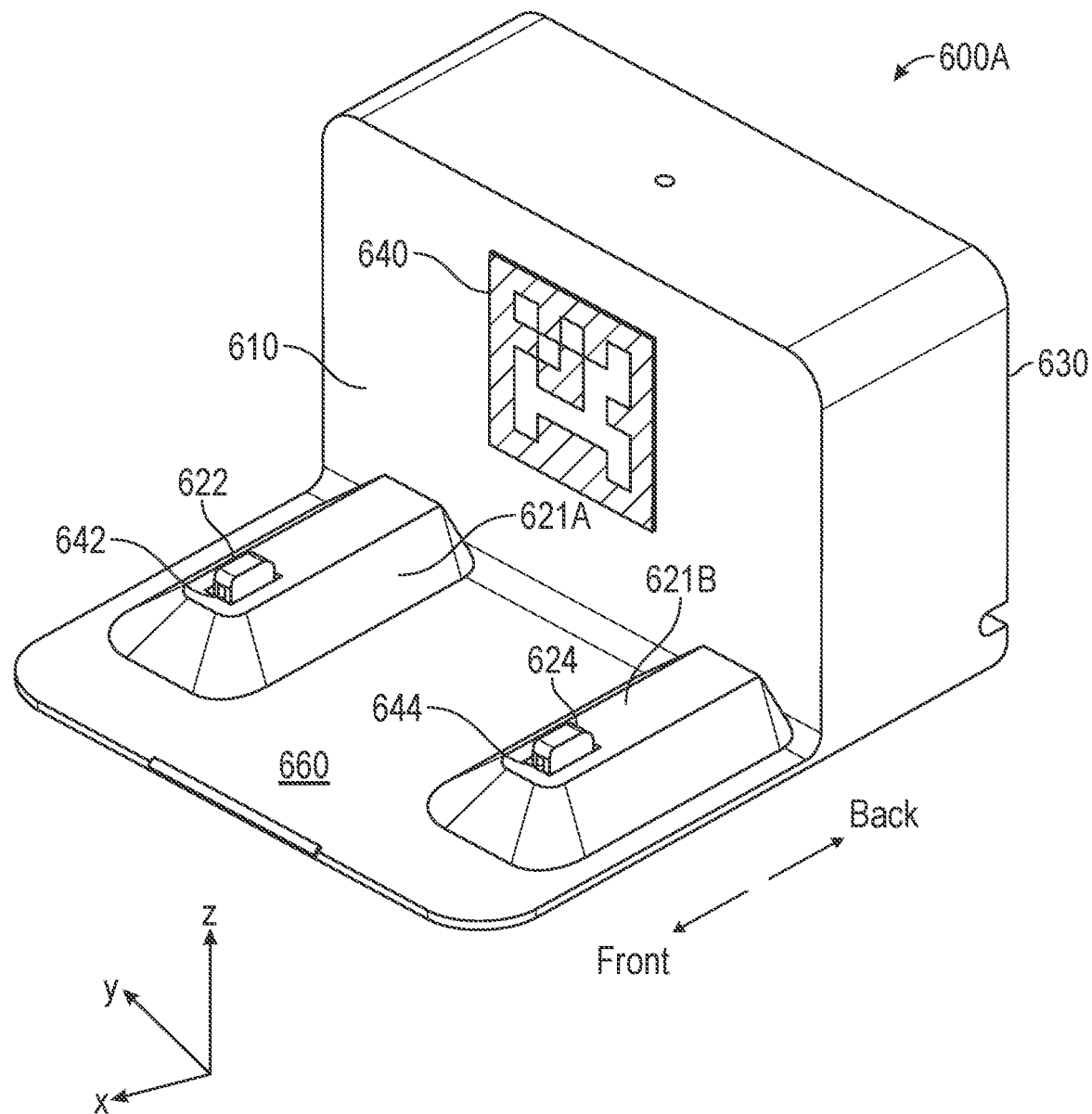
FIGS. 6A-6D illustrate examples of a dock with multiple distinct fiducial markers detectable by a mobile robot for planning docking.
Figure 6B:
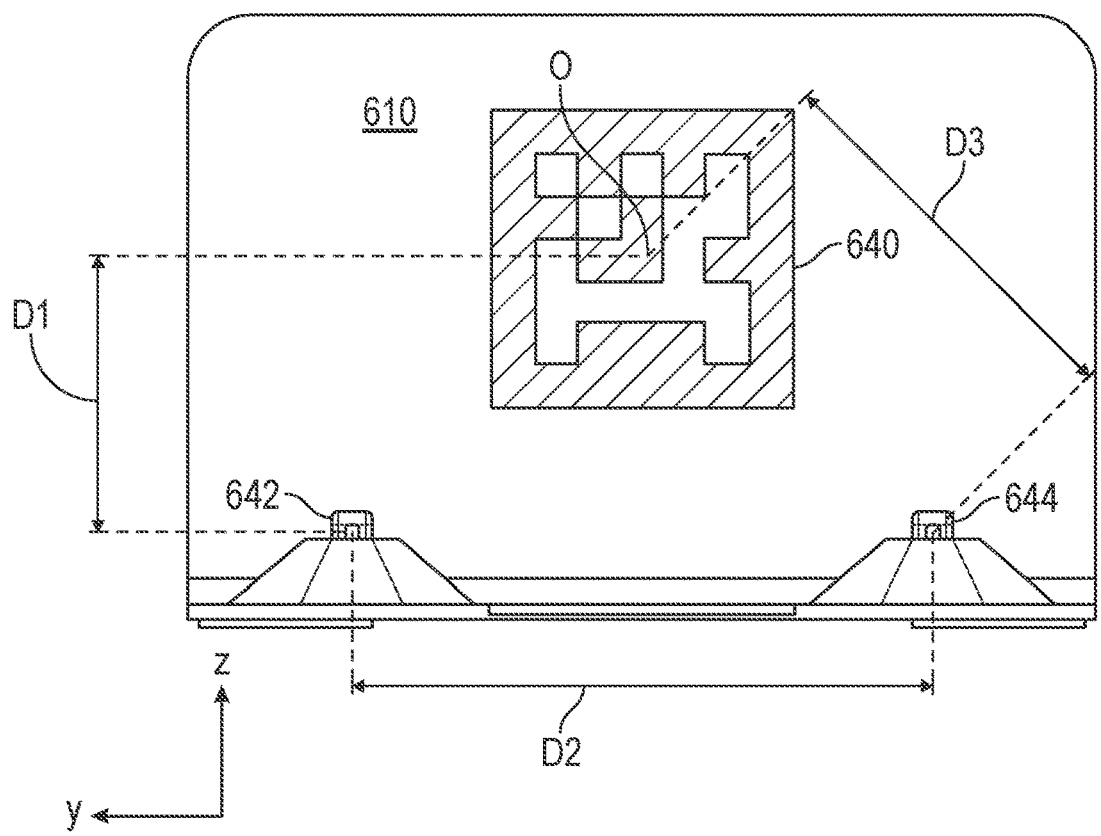
Figure 6C:
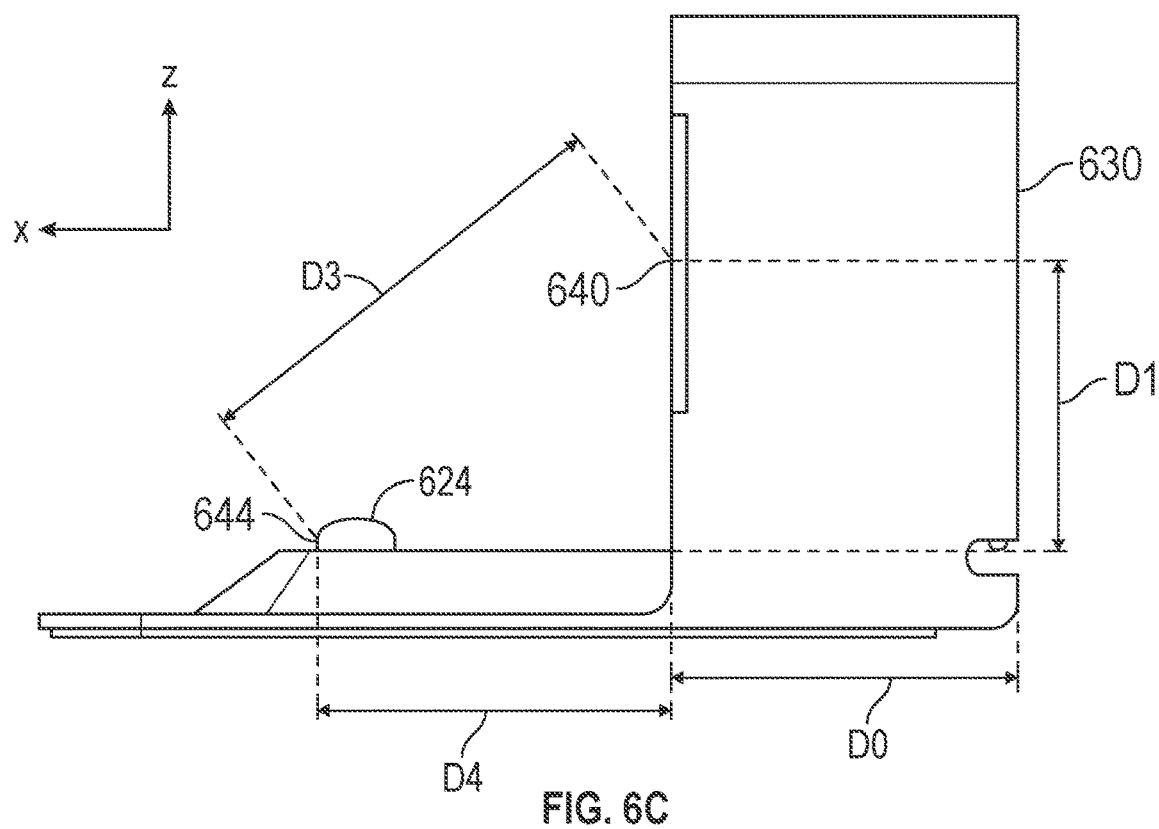

FIGS. 6A-6C illustrate examples of a dock 600A with multiple distinct and fiducial markers detectable and distinguishable by a mobile robot, such as the mobile robot 100. FIG. 6A shows an isometric view, FIG. 6B a front view, and FIG. 6C a side view of the dock 600A. The dock 600A includes a docking port 660 for receiving the mobile robot when docked, and an upright portion substantially perpendicular to a horizontal surface of the docking port 660. The upright portion has a front plane 610 facing a docking mobile robot in front of the dock, and a back plane 630 behind the front plane 610. A first fiducial marker 640 can be positioned at approximately the center of the front plane 610, and is aligned with the central axis 550C of the docking lane 550. The first fiducial marker 640 can have a spatially recognizable pattern. In an example, the first fiducial marker 640 is represented by an artificial tag. The artificial tag can be a one-dimensional tag such as a bar code, or a two-dimensional tag such as a logo, a QR code, or an April Tag. The artificial tag can be a retroreflective tag having a first area in a first color and a second area in a second color. The first area can have a higher retro-reflectance than the second area. In an example, the first and second areas have contrasting colors, such as black and white. The artificial tag can have specific size, shape, and pattern detectable and recognizable by a visual system of the mobile robot. In an example, the artificial tag can have a shape of a polygon. In an example, the artificial tag has a shape of a 45 millimeter (mm)-by-45 mm square. An artificial tag in a form of April Tag can be automatically detected and localized even at very low resolution, unevenly lit, oddly rotated, or tucked away in the corner of an otherwise cluttered image. In an example, the artificial tag can be an April Tag consisting of five-by-five (5×5) blocks of black or white squares.

The visual system of the can include an image capture device 140 (e.g., a camera) that can generate an image of the dock 600A or a portion thereof from a distance (e.g., up to 1.5 meters) in front of the dock 500 prior to robot docking. The visual system can recognize the artificial tag from the image. To improve accuracy and robustness of artificial tag recognition, in some examples, the artificial tag may be bounded by an outer boundary having a contrasting color than the front plane 610. In an example, the front plane 610 (and optionally the entire exterior of the dock 500) may be colored in black, and the outer boundary of the artificial tag is colored in white. In some examples, the front plane 610 can be painted or taped with low retro-reflectance and low scattering color or material (e.g., matte black film). In contrast, the bright areas of the artificial tag (e.g., white blocks in the April Tag) can be painted or taped with high retro-reflectance and optionally low scattering color or material (e.g., white or black retroreflective film). The robot may include a lighting source (e.g., light-emitting diode, or LED) to emit light towards the dock. The light incident on the retroreflective coatings of the fiducial markers is reflected back to the robot's camera. As a result, the artificial tag appears bright in the camera image, regardless of the color of the retroreflective film. This may improve the detection of the fiducial markers by the visual system of the robot even in low-light conditions or in complete darkness.

The dock 600A can include two docking platforms 621A and 621B elevated from the horizontal surface of the docking port 660. The docking platforms 621A and 621B can be symmetric about the center of the dock: they are located at opposite lateral positions along the y-axis, and have substantially the same distance from the center of the dock. As illustrated in FIGS. 6A and 6B, the docking platform 621A is on one lateral position along the positive y-axis, and the docking platform 621B is on the opposition lateral position along the negative y-axis. The docking platforms 621A and 621B each include respective charging contacts 622 and a 624 which, similar to the charging contacts 522 and 524 of the dock 500, can be electrically coupled to a charging system that can charge a battery of the mobile robot 100 when docked on the dock 500.

The charging contacts 622 and 624 can each include respective raised portions above a horizontal surface of the respective docking platform. A second fiducial marker 642 can be disposed in a vertical surface of the raised portion of the charging contact 622. A third fiducial marker 644 can be disposed in a vertical surface of the raised portion of the charging contact 624. Generally, the higher up the fiducial markers 642 and 644 positioned above the docking port 660, the less likely these fiducial markers would be visually obstructed by objects along the docking path (e.g., carpet fibers or debris on floor), and consequently are more likely to be detected by the visual system of the mobile robot. An example of the secondary fiducial markers disposed on charging contacts is described below with reference to FIGS. 7A-7B.

As the first fiducial marker 640 is positioned at approximately the center of the front plane 610 and the docking platforms 621A and 621B are symmetric about the center of the dock, the fiducial markers 642 and 644 are symmetric about the first fiducial marker 640, and have substantially the same distance from the first fiducial marker 640 in opposite lateral directions (positive and negative y-axis, respectively).

The first fiducial marker 640 is above the horizontal surfaces of the docking platforms 621A and 621B (approximate locations of the fiducial markers 642 and 644) by a distance D1 along the z-axis. In an example, D1 is approximately 40 millimeters (mm). The first fiducial marker 640, located on the front plane 610, is offset from the back plane 630 by a first distance D0 along the x-axis. The fiducial markers 642 and 644 can be on the same plane parallel to the back plane 530, with an offset from the back plane 530 by a distance greater than D0. As shown in FIG. 6C, the fiducial markers 642 and 644 can each be offset from the first fiducial marker 640 by a distance D4 along the x-axis. Generally, a larger distance D4 may correspond to a "deeper" 3-D fiducial system with farther-apart fiducial markers. This can provide more accurate and robust estimate of robot pose or heading direction with respect to the dock. By way of example and not limitation, D4 is approximately 50 mm. In some examples, D4 can be within one of the distance ranges from 10-90 mm, 20-80 mm, 30-70 mm, 40-60 mm, 45-55 mm, 10-30 mm, 20-40 mm, 30-50 mm, 50-70 mm, or 60-80 mm. The Euclidean distance, D3, between the first fiducial marker 640 and either of the fiducial markers 642 or 644, in the x-y-z coordinate system as shown in FIGS. 6B and 6C, is approximately 60 mm, in a non-limiting example.

The fiducial markers 642 and 644, which are positioned respectively on the docking platforms 621A and 621B, have an in-between distance of approximately equivalent to the inter-platform distance D2. In an example, D2 is approximately 90 mm. In some examples, D2 can be within one of the distance ranges from 30-130 mm, 40-120 mm, 50-110 mm, 60-100 mm, 70-90 mm, 30-60 mm, 50-80 mm, 70-100 mm, 90-100 mm, or 110-130 mm.

Figure 6D:
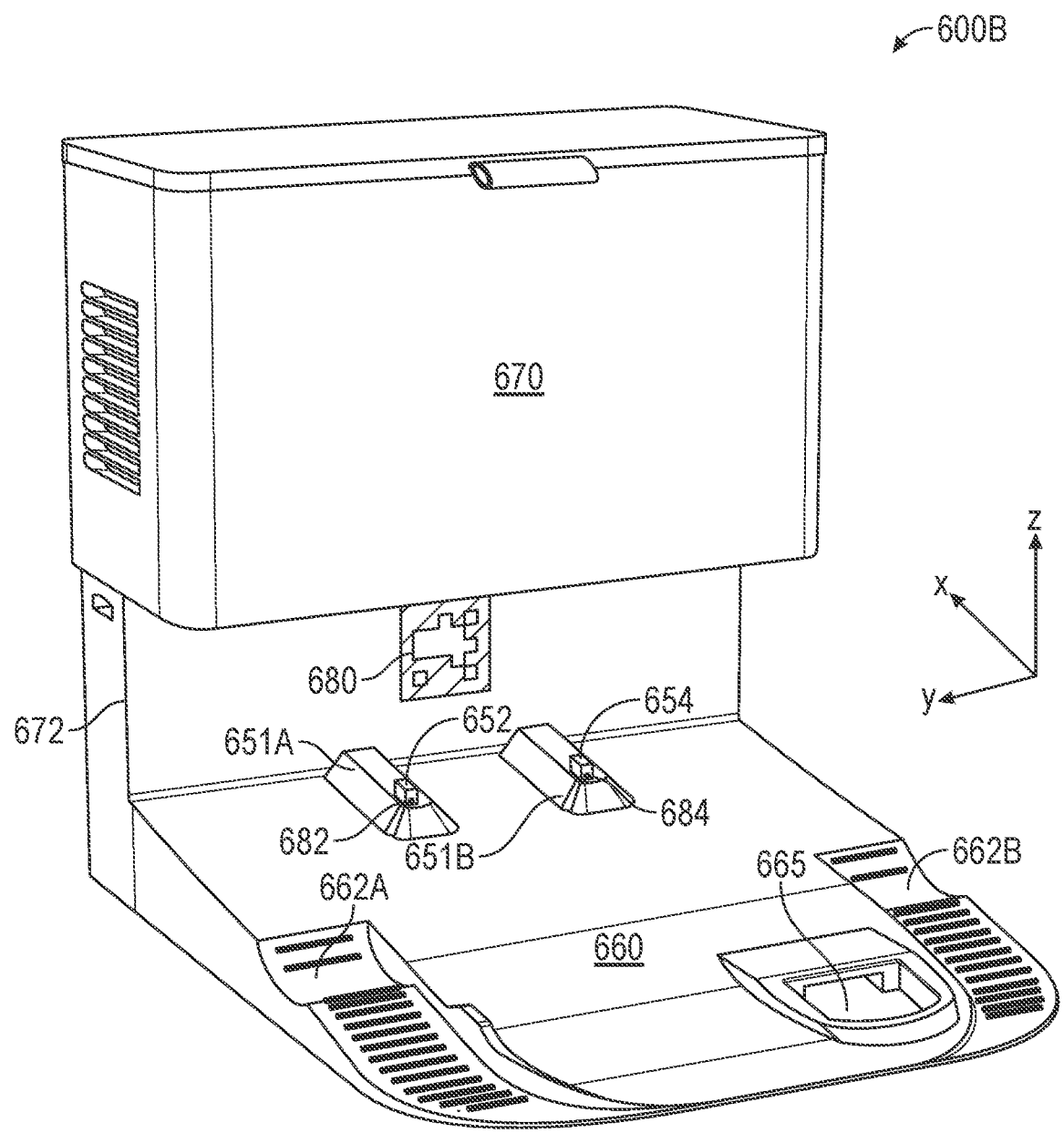

FIG. 6D shows an isometric view of another example of a dock 600B that includes a first fiducial marker 680 and one or more secondary fiducial markers, such as 682 and 684 as shown, that are detectable by a mobile robot and used for planning docking. The first fiducial marker 680 is disposed at substantially the center of a front plane 672 of the dock 600B below a receptacle 670 for evacuating debris from a mobile robot that is docked on the dock 600B. The secondary fiducial markers 682 and 684, similar to the fiducial markers 642 and 644 shown in FIG. 6A, can be disposed at respective charging contacts 652 and 654 mounted on respective docking platforms 651A and 651B elevated from a horizontal surface of the docking port.

Similar to the fiducial markers in the dock 500 and 600A, the first fiducial marker 640 can be located on the center of the front plane 672. The fiducial markers 682 and 684 can be substantially symmetric about the center of the dock (where the first fiducial marker 640 is located) along the y-axis. The fiducial markers 642 and 644 can be non-coplanar with, and in front of, the first fiducial marker 640 along the x-axis. Compared to dock 600A where the second fiducial markers 542 and 544 are more distant away from the first fiducial marker 540 in the direction of the x-axis, the secondary fiducial markers 682 and 684 have a shorter distance from the first fiducial marker 680. When docking, the mobile robot may align its wheels with dock detents 662A and 662B, use charging contacts to charge the battery of the mobile robot, and/or engage its air path with the evacuation collar 665 on the docking port 660 before the evacuation system extracts debris from the mobile robot.

In various examples, one or more secondary fiducial markers (e.g., fiducial markers 542, 544, 642, 644, 682, or 684) can be formed using retroreflective coatings (e.g., retroreflective tapes, films, or patches) attached to, or placed in proximity to, respective charging contacts. For example, the fiducial marker 642 can be formed by a retroreflective coating attached to, or placed in proximity to, a portion of the charging contact 622. The fiducial marker 644 can be formed by a retroreflective coating attached to, or placed in proximity to, a portion of the charging contact 624. The retroreflective coatings of the fiducial markers can reflect the light incident thereon (such as emitted from a light source of the robot) back to the camera of the robot, such that the fiducial markers appear bright in the camera image even in low-light conditions or in complete darkness, thereby improving detection of the fiducial markers from the image.

Figure 7A:
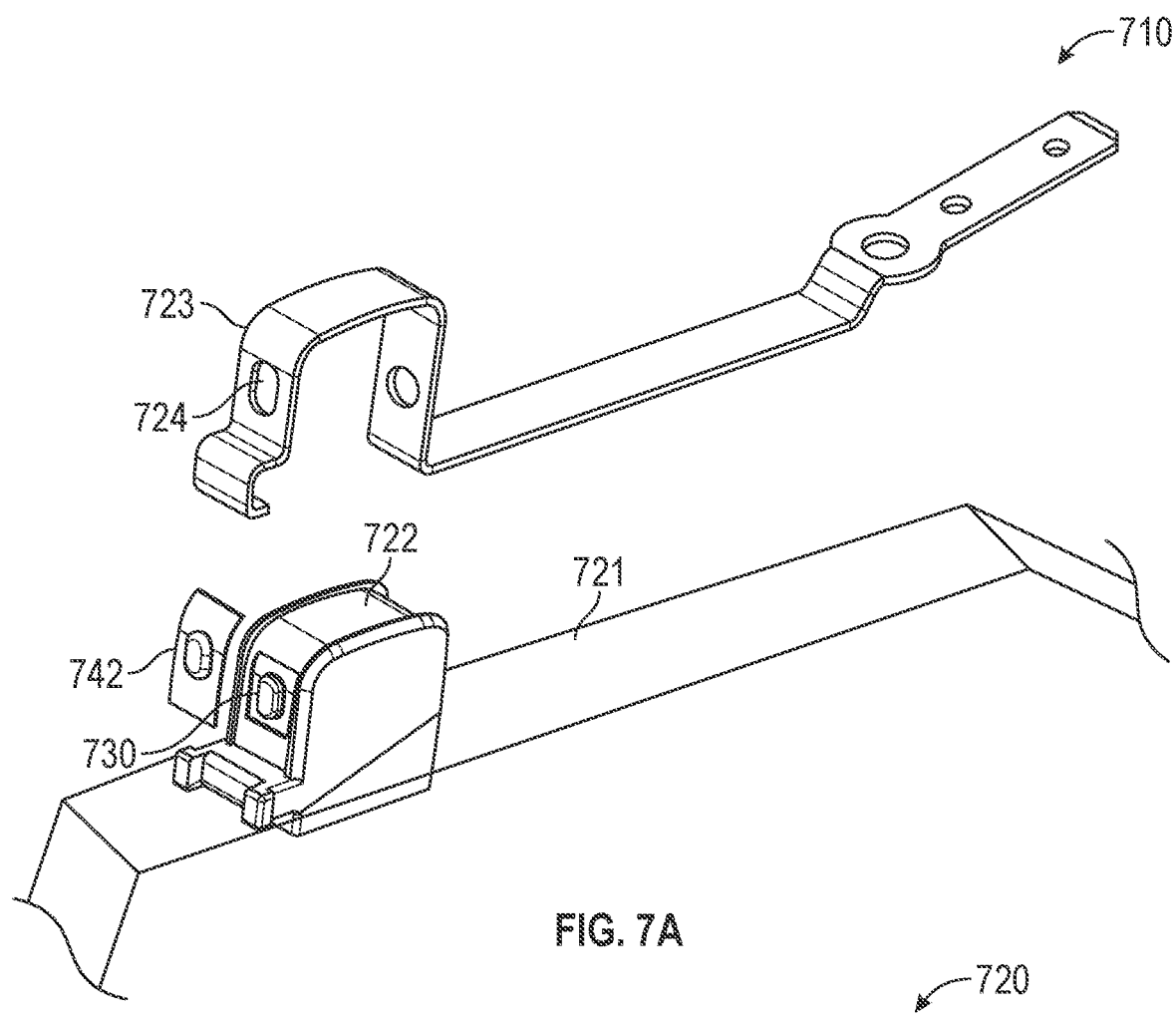
FIGS. 7A-7B illustrate examples of a fiducial marker formed by retroreflective coatings attached to, or placed in proximity to, a charging contact on the dock.
Figure 7B:
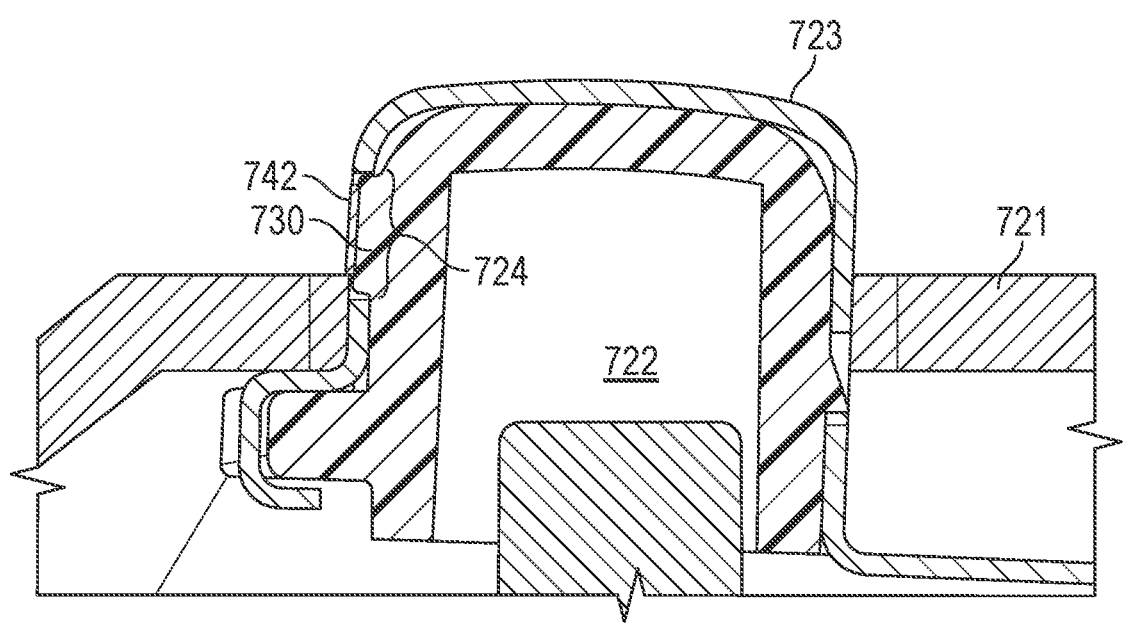

FIGS. 7A-7B illustrate examples of fiducial markers formed by retroreflective coatings on respective charging contacts on the dock. FIG. 7A is an isometric view 710, and FIG. 7B a side cut-away view 720, of a charging contact 723 mounted over a base structure 722 protruding from a horizontal surface of the charging platform 721. The charging contact 723 can have a curved portion substantially conforming to an exterior of the base structure 722. The base structure 722 can be made of plastic or other insulation material, and provide support and fixation for the charging contact 723. In an example, the charging contact 723 can have a through-hole 724 that can expose a surface portion of the base structure 722 behind the through-hole 724. A retroreflective coating 742 can be attached to the exposed surface portion of the base structure 722, and serve as a secondary fiducial marker.

In some examples, the base structure 722 can include, on a vertical surface thereof, a raised portion 730 (e.g., a molded bump) sized, shaped, or otherwise configured to fit in the through-hole 724. The retroreflective coating 742 can be attached to, or placed in proximity to, the raised portion 730, and serve as a secondary fiducial marker. In an example, the raised portion 730 can substantially flush with the vertical surface of the charging contact 723 abutting the through-hole 724, such that the retroreflective coating 742 on the raised portion 730 is substantially co-planar with the vertical surface of the charging contact. As the debris accumulation on the retroreflective coating 742 may reduce its reflectivity and hence the detectability by the mobile robot's visual system, a fiducial marker co-planar with the neighboring charging contact surface can facilitate cleaning and maintenance (e.g., replacement) of the retroreflective coating 742.

FIG. 8 is a block diagram illustrating an example of a mobile robot docking system 800 for docking a mobile cleaning robot using visual fiducial markers disposed at different locations on the dock. The mobile robot docking system 800 comprises a mobile cleaning robot 810 and a dock 820. The dock 820, an embodiment of the dock 500, 600A, or 600B or a variation thereof, can include fiducial markers 821, a charging system 822, and an optional evacuation system 823. The fiducial markers 821 can include a first fiducial marker (e.g., fiducial markers 540, 640, or 680), and second one or more fiducial markers (e.g., fiducial markers 542, 544, 642, 644, 682, or 684), as illustrated in FIGS. 5A-5B and 6A-6D. The charging system 822 can be electrically coupled to the charging contacts on a dock platform to charge the battery of the mobile cleaning robot 810 docked on the dock. The optional evacuation system 823 can extract debris from the mobile cleaning robot.

The mobile cleaning robot 810, such as the mobile robot 100 or a variation thereof, may include a visual system 811, a controller circuit 814, and a drive system 818. The visual system 811 may be coupled to one or more sensors, such as those included in the sensor system 320 of the mobile robot 100, as described above with reference to FIGS. 2A-2B and 3. In an example, the visual system 811 may include an imaging sensor 812, such as a camera or other types of imaging devices. The imaging sensor 812, an example of the image capture device 140 shown in FIG. 1, can take an image of the dock 820 or a portion thereof when the mobile cleaning robot 810 moves in the docking area, and when the dock 820, or a portion thereof containing the fiducial markers, is within the field of view of the imaging sensor 812. In an example, the mobile cleaning robot 810 includes a light source (e.g., LED) that can emit light at a specific direction, such as the front of mobile cleaning robot and within the field of view of the imaging sensor 812. The fiducial markers 821 can include respective retroreflective coatings that can reflect the light, emitted from the light source and incident on the retroreflective coatings, back to visual system 811 and captured by the imaging sensor 812 in the image. The reflected light from the retroreflective coatings make the fiducial makers appear bright in the camera image even in low-light conditions or in complete darkness. This can help improve the detection of the fiducial markers by the visual system 811.

In some examples, the mobile cleaning robot 810 can estimate a distance between the current robot position and the dock, and determine that the mobile cleaning robot 810 has entered a docking area if the estimated distance is within a specific range, such as within 1.5 meters from the dock 820. In an example, the image may be taken at the time of handoff between a far docking process and a near docking process. The far docking occurs when the mobile cleaning robot 810 navigates to the docking area based on, for example, a first portion of an image of the dock. The subsequent near docking process occurs when the mobile cleaning robot 810 looks at a different second portion of the dock image at a higher resolution and to look for fiducial markers on the dock 820, and fine-tunes mobile robot's heading direction with respect to the dock 820 to ensure a successful docking.

In some examples, the imaging sensor 812 can automatically adjust image resolution and frame rate, such as based on the estimated distance between the current robot position and the dock. For example, when the mobile cleaning robot is in a long-range docking mode (e.g., 0.75-1.5 meters from the dock) such as at the beginning of docking process, the imaging sensor 812 can operate at a higher image resolution (e.g., 1280×960 pixels), optionally at a lower frame rate (e.g., 8 frames per second (fps)). As the mobile cleaning robot 810 approaches toward the dock and in a "short-range" docking mode (e.g., 0.18-0.75 meter from the dock), the imaging sensor 812 can reduce the image resolution (e.g., down to 640×480 pixels) optionally at a higher frame rate (e.g., 25 fps).

In some examples, the mobile cleaning robot 810 can include a lighting module with adjustable illumination. The lighting module can automatically adjust Front Facing Illumination (FFT) and/or the Pulse Width Modulation (PWM) settings based on, for example, an estimate of ambient light level. In an example, the lighting module can select from a plurality of pre-determined settings, such as PWMs of 1%, 15%, 45%, and 100%. In some examples, the lighting module can automatically adjust FFI and/or PWM based on the estimated distance between the current robot position and the dock. A higher PWM and/or FFI may be used in the long-range docking mode, and a lower PWM and/or FFI may be used in the low-range docking mode. If the fiducial markers are not detected (such as due to low lighting condition of the environment where the dock is located), the imaging sensor 812 can automatically increase its PWM.

The visual system 811 may include an image processor 813 that can process the image taken by the imaging sensor 812. The image processing may include, for example, filtering, contrast enhancement, thresholding, segmentation, clustering, edge detection, sampling, edge refinement, among others. Such image processing can help improve the accuracy and reliability of fiducial marker recognition and localization, and hence the accuracy of determining the robot pose and heading direction relative to the dock. In an example, the image processor 813 can apply a filter to the image of the dock, and detect from the filtered image one or more fiducial markers. A non-limiting example of the filter is a Laplacian-of-Gaussian filter. The image processor 813 can extract positional, geometric, or morphologic features from one or more of the detected fiducial makers. In an example, the image processor 813 can extract features representing the pattern of a polygonal retroreflective artificial tag (e.g., the black-and-white boxes of an April Tag as shown in fiducial markers 540 or 640), or pixel positions representing the center and/or one or more edges or corners of the polygonal retroreflective artificial tag. The polygonal retroreflective artificial tag can be a retroreflective tag. In another example, the image processor 813 may apply thresholding to the filtered image, and find local maxima of the pixels within a search area relative to the detected artificial tag. Positions of the secondary fiducial markers (e.g., 542, 544, 642, 644, 682, or 684) can be estimated using the locations of the local maxima. In some examples, the image processor 813 can extract features representing relative positions of, or distances between, different detected fiducial markers. Examples of detecting and localizing the fiducial markers from the image of the dock are discussed below, such as with reference to FIG. 9.

The controller circuit 814 can include a dock identifier 815, a robot heading detector 816, and a docking navigator 817 to navigate the mobile cleaning robot 810 to the dock 820. The dock identifier 815 can recognize the dock 820 based at least on the detected first fiducial marker, such as a distinct pattern of an artificial tag (e.g., black and white blocks in an April Tag) detected by the image processor 813. The pattern of the artificial tag can be unique to the dock 820.

The robot heading detector 816 can determine a pose or heading direction of the mobile cleaning robot with respect to the dock 820 using the detected first fiducial marker (also referred to as the primary fiducial marker, e.g., 540, 640, or 680) and one or more detected secondary fiducial markers (e.g., 542 and/or 544, 642 and/or 644, or 682 and/or 684). In an example, the heading direction can be represented by an angle (θ) offset from normal to a back plane of the dock. Once the heading direction is determined, the docking navigator 817 can generate a control signal to the drive system 818 to adjust the heading of the mobile cleaning robot 810 until the offset angle (θ) is within a specific range, such as within +/−1 degree of normal to the back plane in an example.

The offset angle (θ) can be estimated using the first fiducial marker and/or one or more secondary fiducial markers. The first fiducial marker can provide a more accurate estimate of the offset angle when the robot is closer to the dock. In some cases, the offset angle estimate based on the primary fiducial marker can be more accurate when the robot poses away from the docking axis (i.e., large offset angle θ). On the other hand, the secondary fiducial markers may be more reliably detected when the robot is closer to the dock than when the robot is farther away from the dock. To achieve good alignment with respect to the dock, in some examples, the docking navigator 817 can perform a tiered navigation based on the offset angle (θ) estimated by using first fiducial marker and/or one or more secondary fiducial markers. When the robot is at a distances farther away the dock (e.g., up to 1.5 meters) and/or poses at a large offset angle (e.g., up to +/−60 degrees), the robot may rely only on the first fiducial marker to estimate robot pose or heading direction (e.g., the offset angle θ). The docking navigator 817 may use the estimated offset angle as a feedback to control the adjustment of robot heading. As the robot drives closer to the dock (e.g., 75 cm with an offset angle of up to +/−20 degrees), a combination of the first fiducial marker and one or more secondary fiducial marker may be used to determine a more accurate estimate of robot pose or heading direction. Such a tiered navigation strategy can allow the robot to receive current pose estimates with low enough errors throughout the docking process, from long to short distances from the dock, and with different and changing robot poses and heading directions, thereby improving the docking success rate and efficiency.

In various examples, the docking navigator 817 can use a feedback controller to adjust the heading of the mobile cleaning robot 810. The heading direction can be adjusted until an accurate alignment is achieved, such as when the offset angle (θ) falls within a specified tolerance range. Accurate alignment can improve docking success rate. The feedback controller can take the presently detected heading direction, or the offset angle (θ), as a feedback parameter. Examples of the feedback controller can include a Proportional-Integral (PI) controller, a Proportional-Integral-Derivative (PID) controller, or a fuzzy-logic based controller such as a fuzzy PI controller or a fuzzy PID controller, among others. The drive system 818 can drive the mobile cleaning robot 810 toward the dock 820 in accordance with the adjusted heading direction until it docks.

The present inventors have contemplated various techniques to improve the accuracy and robustness of robot pose or heading direction detection. In an example, the robot heading detector 816 can determine the heading direction, or estimate the offset angle θ, using the positions of the detected second one or more fiducial markers (e.g., the second fiducial marker 542, 642, or 682; and the third fiducial marker 544, 644, or 684) relative to the position of the detected first fiducial marker (e.g., the fiducial marker 540, 640, or 680). In an example, the robot heading detector 816 can measure a first distance $d_{AB}$ between a position $P_A$ (e.g., the center) of the detected first fiducial marker and a position $P_B$ (e.g., the center) of the detected second fiducial marker (542, 642, or 682), and a second distance $d_{AC}$ between the position $P_A$ and a position $P_C$ (e.g., the center) of the detected third fiducial marker (544, 644, or 684). The first and second distances $d_{AB}$ and $d_{AC}$, both measured from the processed image of the dock, represent respective distances in the perspective of the visual system 811 of the mobile cleaning robot, and are both functions of the robot pose or heading direction. When the robot is posed such that its heading is aligned with the central axis 550C of the docking lane (that is, θ=0), the distances $d_{AB}$ and $d_{AC}$ are substantially the same, due to the symmetry of the second and third fiducial markers about the first fiducial marker along the y-axis. When the robot's heading is offset from the normal direction (that is, θ≠0), the distances $d_{AB}$ and $d_{AC}$, in the perspective of the visual system 811, are different. For example, as illustrated in FIGS. 5A and 5B, for the robot pose P2 and the second heading direction 580B (corresponding to offset angle θ), $d_{AB} > d_{AC}$; for the robot pose P3 and the third heading direction 580C (corresponding to offset angle θ'), $d_{AB} < d_{AC}$. The robot heading detector 816 can determine robot heading, or compute the offset angle, based on a comparison of $d_{AB}$ and $d_{AC}$ measured from the processed image.

In various examples, the robot heading detector 816 can determine the robot heading direction, or compute the offset angle, further using dock dimension information including actual positions of the second one or more fiducial markers relative to the first fiducial marker. In an example, the robot heading detector 816 can estimate the position ($\widetilde{P_B}$) of a second fiducial marker on the charging contacts (e.g., any one of 542, 544, 642, or 644) using the detected position ($P_A$) of the first fiducial marker (e.g., 540, 640, or 680) and the actual positional information (e.g., distance and orientation) of a second fiducial marker relative to the first fiducial marker. Referring to FIG. 9, an image 900 of at least a portion of the dock 820 was generated by the visual system 811 when the mobile cleaning robot 810 is at an unknown pose and heading (represented by the offset angle θ). Included in the image 900 is an artificial tag 940A at the center of a front plane 910 of the dock. The artificial tag 940A, and its position $P_A$ represented by the position of the center 945 of the artificial tag, can be detected from the image by the image processor 813. The dock identifier 815 can recognize the dock 820 based on the image of the artificial tag 940A.

The robot heading detector 816 can use the detected location ($P_A$) of the artificial tag 940A, and the actual positional information of one or more secondary fiducial markers (e.g., 542 and 544, or 642 and 644, or 682 and 684) relative to the artificial tag 940A, to determine an estimated positions ($\widetilde{P_B}$) 942B and 944B of the fiducial markers on the charging contacts on the image. The estimated positions $\widetilde{P_B}$ are estimated assuming the robot heading is normal to the backplane (that is, θ=0).

The image processor 813 may detect positions of the fiducial markers 942A and 944A from the image 900. In an example, the image processor 813 may determine a search space, represented by the contact boxes 962 or 964 centered at each of the two estimated fiducial marker positions 942B and 944B. The contact boxes each define respective regions of charging contacts where the second fiducial markers are expected to be located. The image processor 813 can detect within each contact box pixel location of the brightest blobs as the detected fiducial marker positions ($P_B$) 942A and 944A. In some examples, the image processor 813 may apply Gaussian weights to the pixels within each contact box, such that the pixels closer to the centers of a contact box (i.e., the estimated fiducial marker positions 942B or 944B) are weighted greater than the pixels farther away from the center. Because the actual fiducial marker positions are more likely to be within close proximity to the estimated positions 942B and 944B, the Gaussian weighted contact box may improve accuracy and efficiency of detecting the positions of the fiducial markers 942A and 944A.

As illustrated in FIG. 9, the estimated fiducial marker position ($\widetilde{P_B}$) 942B or 944B does not overlap with the respective detected fiducial marker position ($P_B$) 942A or 944A. As discussed above, the estimated positions $\widetilde{P_B}$ can be determined based on the assumption of θ=0. The discrepancy between the estimated positions $\widetilde{P_B}$ and the detected positions $P_B$ indicates a degree of misalignment between the mobile robot's heading direction and the normal direction to the back plane (i.e., the offset angle θ). The robot heading detector 816 can determine the robot heading direction, or compute the offset angle θ, based on the discrepancy between $P_B$ and $\widetilde{P_B}$. The mobile robot can feedback-control its drive system (e.g., the drive system 818 shown in FIG. 8) to adjust the heading of the mobile robot using the difference between $P_B$ and $\widetilde{P_B}$ as a feedback parameter, such as when the difference between $P_B$ and $\widetilde{P_B}$ falls within an acceptable tolerance, corresponding to the offset angle (θ) being within, for example, +/−1 degree of normal to the back plane.

In various examples, in addition to the second one or more fiducial markers, the robot heading detector 816 can determine robot pose or heading direction further using positions of one or more feature points detected from the image of the first fiducial marker. In an example where the first fiducial marker is a polygonal retroreflective artificial tag, one or more edges or corners of artificial tag may the detected by the image processor 813. In an examples, edges of the polygonal artificial targe can be detected, and a corner can be determined from the edge intersection. FIG. 9 illustrates the detected tag corner positions ($P_X$) 951A, 952A, 953A, and 954A. The image processor 813 may further estimate tag corner positions ($\widetilde{P_X}$) 951B, 952B, 953B, and 954B, such as by using the detected tag center location 945 and dimensional information including distances and orientations of the tag corners relative to tag center. Similar to the discrepancy between the estimated positions $\widetilde{P_B}$ and the detected positions $P_B$ of the second one or more fiducial markers as discussed above, the discrepancy between the estimated positions $\widetilde{P_X}$ and the detected positions $P_X$ of the tag corners can indicate a degree of misalignment of robot heading with the normal direction to the back plane, and can therefore be a function of the offset angle (θ). The robot heading detector 816 can determine the robot heading, or compute the offset angle (θ), based on the discrepancy between $P_X$ and $\widetilde{P_X}$. In the example as shown in FIG. 9, the discrepancy between $P_X$ and $\widetilde{P_X}$ is not as much as the discrepancy between $P_B$ and $\widetilde{P_B}$. In some examples, the robot heading detector 816 can determine robot pose and heading, or compute the offset angle θ, using both the discrepancy between $P_X$ and $\widetilde{P_X}$ and the discrepancy between $P_B$ and $\widetilde{P_B}$ for a more accurate and robust estimate of robot heading.

Figure 10A:
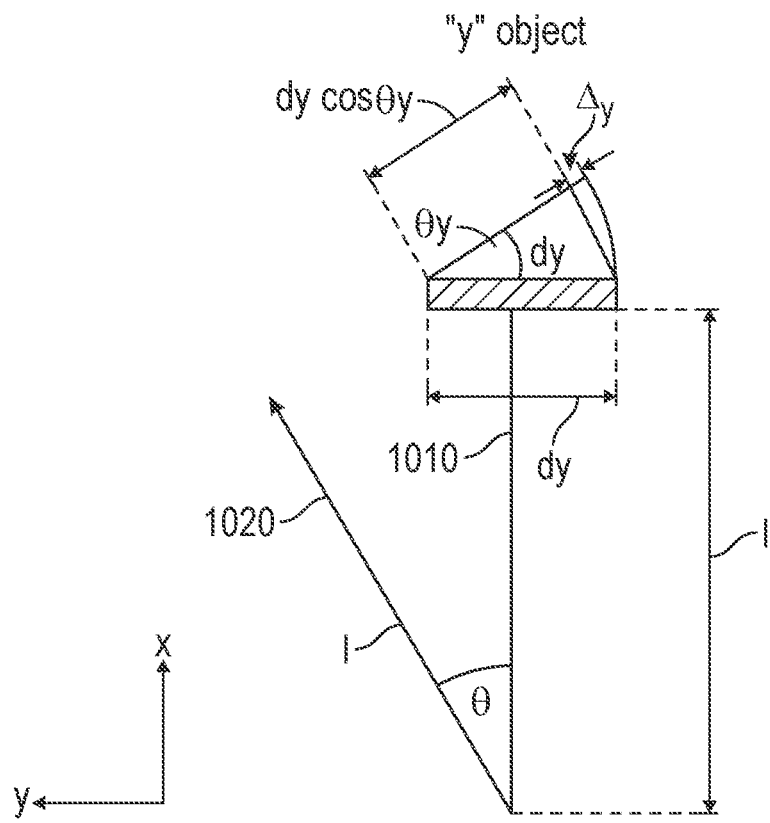
FIGS. 10A-10B illustrate examples of determining robot heading direction based on of apparent width of an object or a distance between two landmarks on the dock in the perspective of the mobile robot.
Figure 10B:
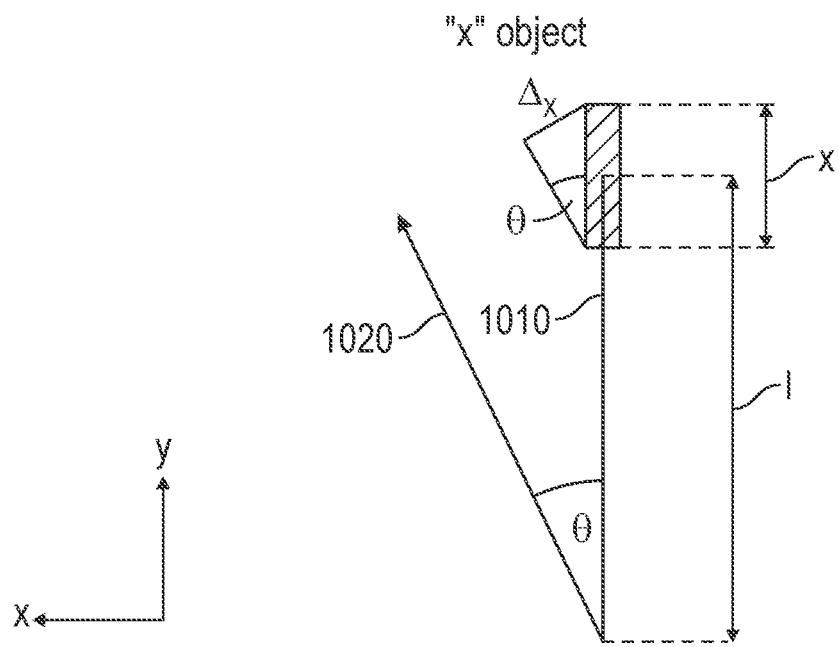

When the mobile robot is at a particular pose or heading direction, the geometry of an object on the dock (e.g., a width of an object, or a distance between two landmarks such as two fiducial markers on the dock), in the perspective of the visual system of the mobile robot, can be different from the actual geometry of the object. The degree of such difference is correlated to, and can be used to determine, robot heading direction or the offset angle θ. FIGS. 10A-10B illustrate examples of how an apparent width of an object, or a distance between two landmarks on the dock, in the perspective of the mobile robot, can change when the robot heading is not substantially aligned with the normal direction to the back plane of the dock. FIG. 10A shows an object along the y-axis with an actual width of dy. At a first heading 1010 parallel to the x-axis (i.e., normal to the back plane of the dock, or θ=0), the robot-perceived width of the object is the same as the actual width dy. At a different second heading 1020 offset from the normal direction by θ (≠0), the robot-perceived width of the object becomes dy*cos θ. The difference, Δy, between the actual and the perceived width in the y-axis is:

$$\Delta y = dy - dy^* \cos\theta = dy^*(1-\cos\theta) \quad (1)$$

FIG. 10B shows an object along the x-axis with an actual width of dx. At a robot moves from the first heading 1010 parallel to the x-axis to the second heading 1020 offset from the normal direction by θ (≠0), the difference, Δx, between the actual and the perceived width in the x-axis is:

$$\Delta x = dx^* \sin\theta \quad (2)$$

For an object width not lying on the x- or y-axis, or a distance between any two landmarks not lying on the x- or y-axis, the actual width of the object or the actual distance L between the two landmarks can be projected to the x-axis to obtain an actual distance component Lx, and/or projected to the y-axis to obtain an actual distance component Ly. The robot heading detector 816 can detect from the image of the dock a perceived distance component Lx' along the x-axis, or a perceived distance component Ly' along the y-axis, in the perspective of the visual system of the mobile robot at an unknown pose and heading. The robot heading detector 816 can determine the robot heading direction, or compute the offset angle θ, using the difference Δx=Lx−Lx' and Equation (2) above, or using the difference Δy=Ly−Ly' and Equation (1) above.

The two landmarks used for the distance measure and robot heading detection as discussed above can be selected from the first fiducial marker and second one or more fiducial markers. For example, for the fiducial markers that are lying substantially along the y-axis (e.g., 542 and 544, or 642 or 644, or 682 and 684), no distance projection is necessary, and the heading direction (offset angle θ) can be estimated using the Equation (1) above. In another example, the robot heading detector 816 can detect robot heading using a distance between the first fiducial marker and one of the secondary fiducial markers (e.g., between the fiducial markers 540 and 542, or between the fiducial markers 640 and 642). Such inter-fiducial distance, not lying on either x- or y-axis, can be projected to the x-axis or the y-axis. The robot heading direction, or the offset angle θ, can be determined using the projection distance component and Equation (1) or Equation (2) above.

Referring back to FIG. 8, in some examples, the mobile robot docking system 800 can include a mobile device 830 that is operatively in communication with the mobile cleaning robot 810 and the dock 820. The mobile device 830, which is an embodiment of the mobile device 404, may be a smart phone, a personal digital assistant, a laptop computer, a tablet, a smart watch, or other portable computing device. In some examples, the mobile cleaning robot 810 may communicate with the mobile device 830 through the cloud computing system 406, as discussed above with reference to FIGS. 4A-4B. The mobile device 830 may include a user interface that allows a user to create or modify a cleaning mission or perform specific tasks, or monitor the progress of the mission and operating status of the mobile cleaning robot 810. The controller circuit 814 can generate a docking status indicator in response to the mobile cleaning robot being docked in accordance with the adjusted heading direction. The docking status indicator may alternatively be generated by the mobile cleaning robot 810. The docking status indicator can indicate successful docking, or docking anomaly such as a misalignment between the mobile cleaning robot and the charging contacts on the dock, and and/or an improper seal between the mobile cleaning robot and the evacuation intake on the dock. The docking status indicator, or a notification about docking status, can be displayed on the user interface of the mobile device 830.

Examples of Methods of Robot Docking Using Multiple Fiducial Markers

Figure 11:
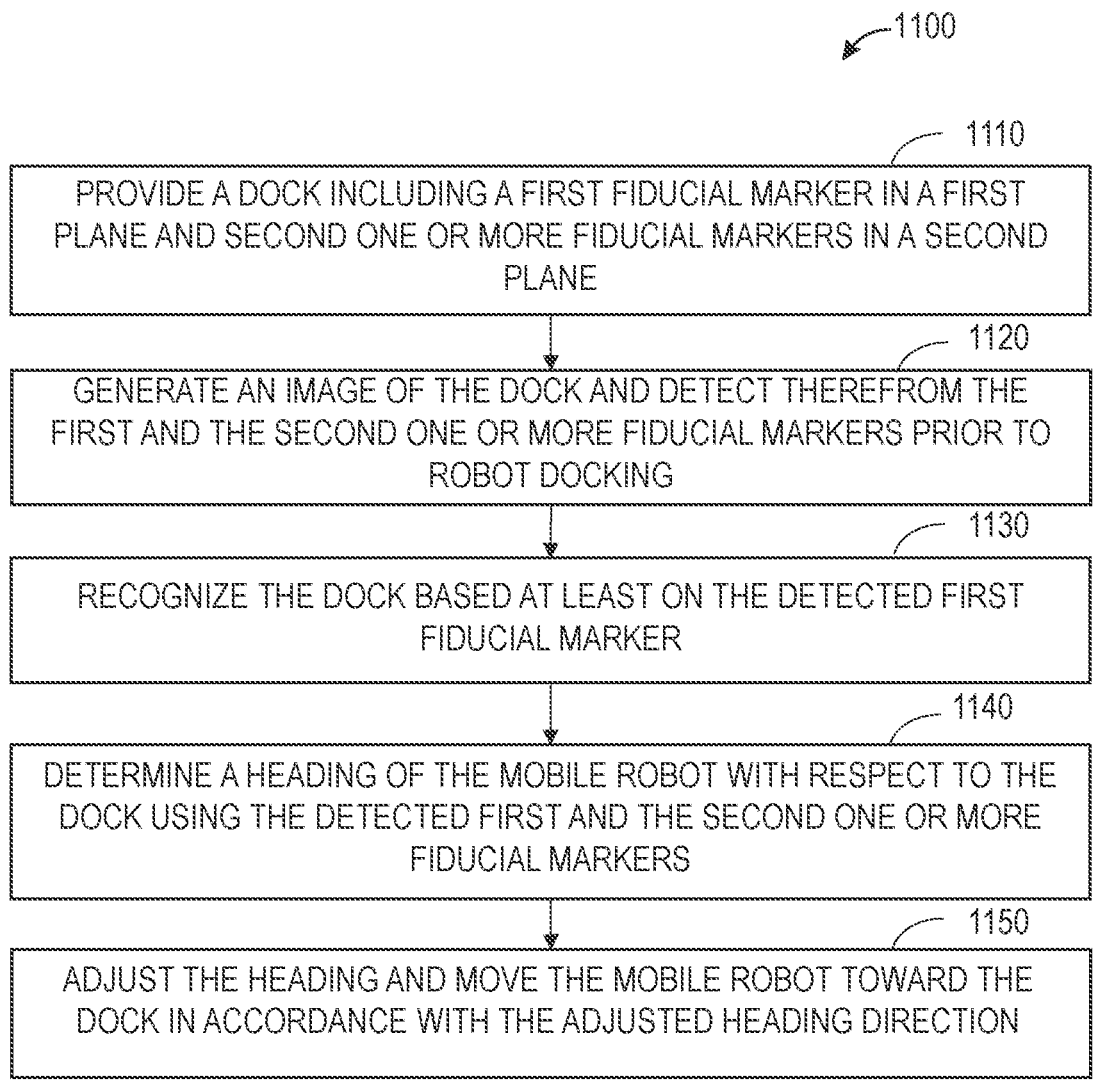
FIG. 11 is a flow diagram illustrating an example of a method for docking a mobile robot to a dock.

FIG. 11 is a flow diagram illustrating an example of a method 1100 for docking a mobile robot to a dock. The dock may include a charging system to recharge the battery of the mobile robot and/or to evacuate the debris collected by and temporarily stored in the mobile cleaning robot. Examples of the mobile robot may include a mobile cleaning robot, a mobile mopping robot, a lawn mowing robot, or a space-monitoring robot. The method 1100 can be implemented in, and executed by, the mobile robot system as shown in FIGS. 5A and 5B, or the mobile robot docking system 800 as shown in FIG. 8.

At 1110, a dock is provided to an environment of a mobile robot, such as an area or a room in a user's home. The dock can include a first fiducial marker located in a first plane of the dock, and second one or more fiducial markers (also referred to as secondary fiducial markers) located in a second plane non-coplanar with the first plane. Examples of the dock and the first and second one or more fiducial markers are illustrated in FIGS. 5A-5B and 6A-6D. As described with reference to those figures, in an example, the first fiducial marker can be an artificial tag, such as a bar code, a logo, a QR code, or an April Tag, among others. The artificial tag can include areas with different colors and/or retro-reflectance. In an example, the secondary fiducial markers can include two retroreflective coatings each attached to, or placed in proximity to, respective charging contacts on a docking platform. The charging contacts are electrically coupled to a charging system of the dock that can charge a battery of the mobile robot when the mobile robot is docked on the dock. In some examples, a retroreflective coating can be attached to, or placed in proximity to, a surface portion of a base structure supporting the charging contact, where the surface portion is behind a through-hole of the charging contact mounted over the base structure. In some examples, the through-hole can be sized and shaped to receive a raised portion of the base structure. The raised portion can substantially flush with an exterior surface of the charging contact abutting the through hole. A retroreflective coating can be attached to, or placed in proximity to, the raised portion of the base structure.

At 1120, an image of the dock or a portion thereof can be generated by a visual system of the mobile robot prior to docking on the dock, such as the visual system 811. The visual system can take an image of the dock or a portion thereof when the mobile cleaning robot is in a docking area away from the dock for a specific distance (e.g., up to 1.5 meters away) and when the dock or the portion that contains the fiducial markers is within the field of view of the imaging sensor of the mobile robot. To improve the image quality and the accuracy of recognizing and localizing the fiducial markers, in some examples, the imaging sensor can automatically adjust image resolution and frame rate, such as based on the estimated distance between the current robot position and the dock. In some examples, the mobile cleaning robot can include a lighting module that can automatically adjust illumination such as based on an estimate of ambient light level.

The visual system can include an image process or process the image of the dock, and detect therefrom the first and the second one or more fiducial markers. The visual system can additionally extract positional, geographical, or morphologic features from one or more of the detected fiducial makers. For example, the visual system can extract features representing a pattern of a polygonal artificial tag, served as the first fiducial marker, and positional information such as positions of the center and four corners of the artificial tag. In another example, the visual system can detect positions of the one or more secondary fiducial markers such as retroreflective coatings each attached to, or placed in proximity to, respective charging contacts, as illustrated in FIGS. 5A-5B and 6A-6D.

At 1130, the dock can be recognized based at least on the detected first fiducial marker, such as using the dock identifier 815 as illustrated in FIG. 8. In an example, the first fiducial marker is represented by an artificial tag having a unique and distinct pattern, such as a pattern of areas with different colors or retro-reflectance (e.g., black and white blocks in an April Tag). The mobile robot can recognize the dock based on the distinct pattern of the detected artificial tag.

At 1140, a pose and heading direction of the mobile cleaning robot with respect to the dock can be detected using the first and the second one or more fiducial markers detected from the image of the dock, such as using the robot heading detector 816. The heading direction can be represented by an angle (θ) offset from normal to a back plane of the dock.

Various techniques can be used to improve the accuracy and robustness of estimating a current pose or heading direction of the mobile cleaning robot with respect to the dock prior to docking. In an example, the robot heading direction (or the offset angle θ) can be determined using the detected positions of the second one or more fiducial markers relative to the detected position of the detection first fiducial marker (e.g., 540, 640, or 680). In an example where the secondary fiducial markers include a second fiducial marker (e.g., 542, 642, or 682) and a third fiducial marker (e.g., 544, 644, or 684), a first distance $d_{AB}$ between the detected first fiducial marker position $P_A$ and the detected second fiducial marker position $P_B$, and a second distance $d_{AC}$ between $P_A$ and the detected second fiducial marker position $P_C$ can be measured from the image. The robot heading direction, or the offset angle (θ), can be determined based on a comparison between $d_{AB}$ and $d_{AC}$.

In an example, the robot heading direction (or the offset angle θ) can be determined further using dock dimension information including actual positions of the second one or more fiducial markers relative to the first fiducial marker. As described above with reference to FIG. 9, the position of a second fiducial marker can be estimated using a position of the detected first fiducial marker ($P_A$) and the actual positions of the second one or more fiducial markers relative to the first fiducial marker. The estimated position ($\widetilde{P_B}$) of the second fiducial marker can be compared to the detected position ($P_B$) of the second fiducial marker directly detected from the dock image as illustrated in FIG. 9. The discrepancy between the estimated positions $\widetilde{P_B}$ and the detected positions $P_B$ indicates a degree of misalignment between the mobile robot and the normal direction to the back plane (i.e., the offset angle θ). The robot heading direction can then be determined based on a comparison between the estimated position $\widetilde{P_B}$ and the detected position $P_B$.

In an example, the robot heading direction (or the offset angle θ) can be determined further using positions of one or more feature points detected from the image of the first fiducial marker, such as positions ($P_X$) of one or more corners of a polygonal retroreflective artificial tag relative to the center of the artificial tag. Similar to the estimated position ($\widetilde{P_B}$) of the second fiducial marker, the tag corner positions may be estimated using the detected tag center location and dimensional information such as distances and orientations of the tag corners relative to tag center. The difference between such estimated tag corner position $\widetilde{P_X}$ and the detected tag corner positions $P_X$ are correlated to a degree of misalignment of robot heading with the normal direction to the back plane. The robot heading, or the offset angle θ, can be determined using a discrepancy between $P_X$ and $\widetilde{P_X}$.

In an example, the robot heading direction (or the offset angle θ) can be determined based on a change in an object width or a distance between two landmarks such as two fiducial markers on the dock, in the perspective of the visual system of the mobile robot, from the actual object width or actual distance between the landmarks or fiducial markers. Such a change in width or distance is correlated to, and can be used to determine, robot heading direction or the offset angle θ, as described above with reference to FIGS. 10A-10B.

At 1150, the heading direction of the mobile cleaning robot can be adjusted such as using a drive system of the mobile cleaning robot. The mobile cleaning robot can then move toward the dock according to the adjusted heading direction. In various examples, a docking status indicator can be generated and provided to the user, such as displayed on a user interface of a mobile device 830. The docking status indicator can indicate successful docking, or docking anomaly such as a misalignment between the mobile cleaning robot and the charging contacts on the dock, and and/or an improper seal between the mobile cleaning robot and the evacuation intake on the dock.

Examples of Machine-Readable Medium for Robot Docking

Figure 12:
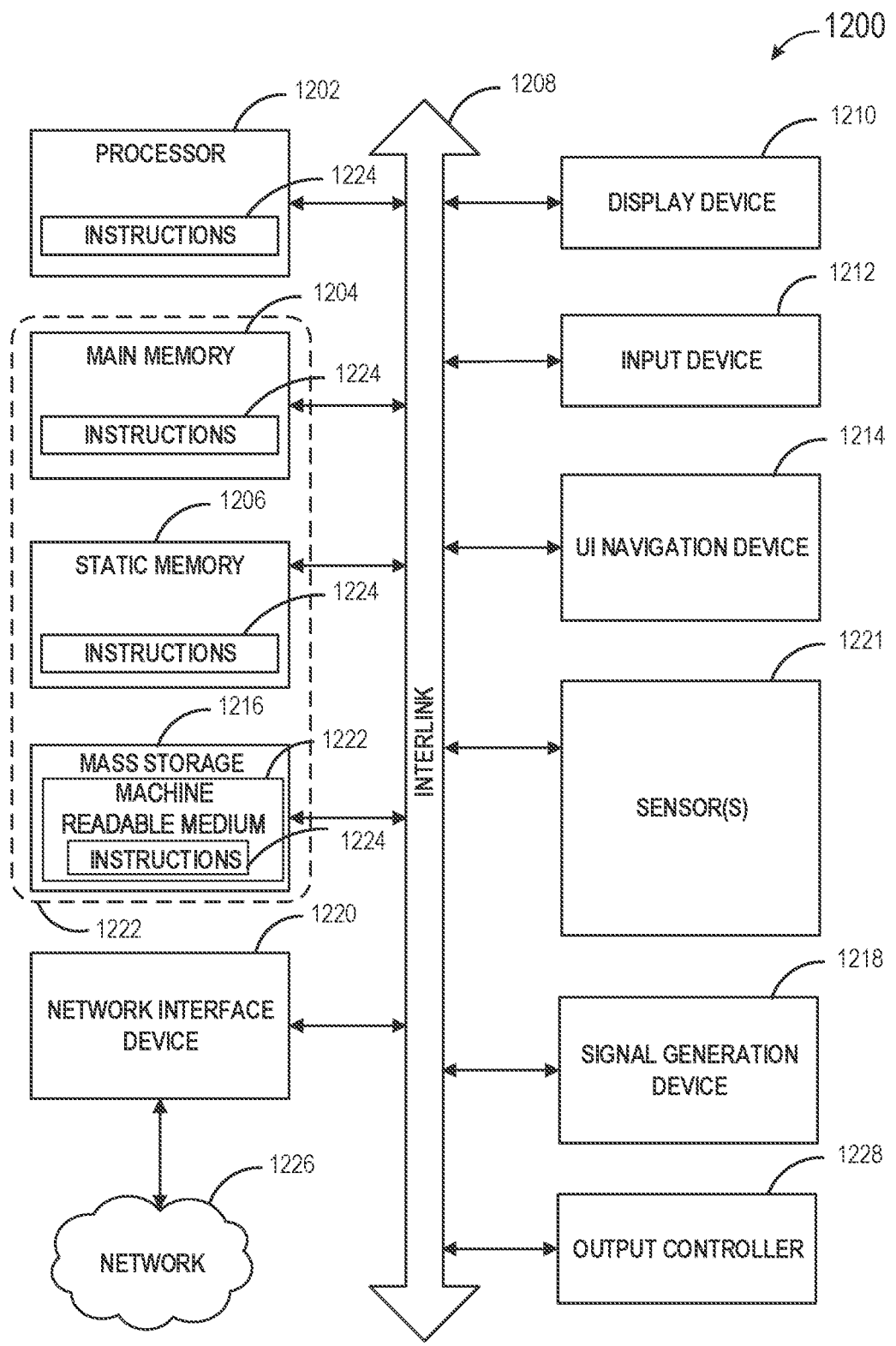
FIG. 12 is a block diagram illustrating an example machine upon which any one or more of the techniques (e.g., methodologies) discussed herein may perform.

FIG. 12 illustrates generally a block diagram of an example machine 1200 upon which any one or more of the techniques (e.g., methodologies) discussed herein may perform. Portions of this description may apply to the computing framework of various portions of the mobile robot 100, the mobile device 404, or other computing system such as a local computer system or the cloud computing system 406.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210 (e.g., a raster display, vector display, holographic display, etc.), an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensors. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine-readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 1224 may further be transmitted or received over a communication network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communication network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A mobile robot system, comprising:
    a dock comprising: a first fiducial marker in a first plane; second one or more fiducial markers in a second plane different from the first plane; a docking platform; and a back plane behind the docking platform, wherein the first plane is parallel to the back plane with a first offset, and the second plane is parallel to the back plane with a second offset greater than the first offset; and
    a mobile cleaning robot including:
        a drive system configured to move the mobile cleaning robot about an environment including a docking area within a distance of the dock;
        a visual system configured to detect the first fiducial marker and the second one or more fiducial markers on the dock; and
        a controller circuit configured to:
            recognize the dock based at least on the detected first fiducial marker;
            determine a heading direction of the mobile cleaning robot with respect to the dock using the detected first fiducial marker and the detected second one or more fiducial markers; and
            generate a control signal to the drive system to adjust the heading direction, and to drive the mobile cleaning robot to the dock in accordance with the adjusted heading direction.

2. The system of claim 1, wherein the second plane is coplanar with the back plane.

3. The system of claim 1, wherein the first fiducial marker includes a retroreflective artificial tag comprising a first area in a first color and a second area in a second color different from the first color, the first area having a higher retroreflectance than the second area.

4. The system of claim 1, wherein the second one or more fiducial markers are each laterally offset from the first fiducial marker.

5. The system of claim 1, wherein the second one or more fiducial markers include a second fiducial marker laterally offset from the first fiducial marker in a first lateral direction, and a third fiducial marker laterally offset from the first fiducial marker in a second lateral direction opposite the first lateral direction.

6. A mobile robot system, comprising:
    a dock comprising a first fiducial marker in a first plane, and second one or more fiducial markers in a second plane different from the first plane, wherein the second one or more fiducial markers are each disposed at, or in proximity to, respective one or more charging contacts on a docking platform of the dock, the one or more charging contacts electrically coupled to a charging system of the dock; and
    a mobile cleaning robot including:

a drive system configured to move the mobile cleaning robot about an environment including a docking area within a distance of the dock;
a visual system configured to detect the first fiducial marker and the second one or more fiducial markers on the dock; and
a controller circuit configured to:
recognize the dock based at least on the detected first fiducial marker;
determine a heading direction of the mobile cleaning robot with respect to the dock using the detected first fiducial marker and the detected second one or more fiducial markers; and
generate a control signal to the drive system to adjust the heading direction, and to drive the mobile cleaning robot to the dock in accordance with the adjusted heading direction.

7. The system of claim 6, wherein:
the mobile cleaning robot includes a light source configured to emit light; and
the second one or more fiducial markers each include respective retroreflective coatings attached to, or placed in proximity to, the respective one or more charging contacts, the retroreflective coatings configured to reflect the emitted light incident thereon back to the visual system of the mobile cleaning robot.

8. The system of claim 7, wherein:
the one or more charging contacts include a first charging contact mounted over a base structure elevated above a horizontal surface of a charging platform of the dock, the first charging contact having a through-hole to expose a surface portion of the base structure behind the through-hole; and
the second one or more fiducial markers include a second fiducial marker comprising a retroreflective coating attached to the exposed surface portion behind the through-hole.

9. The system of claim 8, wherein:
the through-hole of the first charging contact is sized and shaped to receive a raised portion of the base structure; and
the retroreflective coating of the second fiducial marker is attached to the raised portion of the base structure.

10. The system of claim 9, wherein the raised portion of the base structure substantially flushes with an exterior surface of the charging contact abutting the through-hole.

11. The system of claim 1, wherein the controller circuit is configured to:
determine the heading direction including determining an angle offset from normal to the back plane of the dock; and
generate the control signal to the drive system to adjust the heading direction of the mobile cleaning robot until the determined angle is within a specific angle range.

12. The system of claim 1, wherein the visual system includes:
an imaging sensor configured to produce an image of the dock; and
an image processor configured to process the image, and to detect, from the processed image, respective positions of the first and the second one or more fiducial markers.

13. The system of claim 12, wherein the controller circuit is configured to determine the heading direction using the detected positions of the second one or more fiducial markers relative to the detected position of the first fiducial marker.

14. The system of claim 13, wherein the two of the more second fiducial markers include a second fiducial marker and a third fiducial marker, and the controller circuit is configured to:
measure, from the image of the dock, a first distance between the detected first fiducial marker and the detected second fiducial marker, and a second distance between the detected first fiducial marker and the detected third fiducial marker; and
determine the heading direction based on a comparison between the first distance and the second distance.

15. The system of claim 13, wherein the controller circuit is configured to:
receive dock dimension information including actual positions of the second one or more fiducial markers relative to the first fiducial marker;
estimate positions of the second one or more fiducial markers using (1) the detected position of the first fiducial marker and (2) the actual positions of the second one or more fiducial markers relative to the first fiducial marker; and
determine the heading direction based on a comparison between the estimated positions of the second one or more fiducial markers and the detected positions of the second one or more fiducial markers.

16. The system of claim 13, wherein the first fiducial marker includes a polygonal retroreflective artificial tag, and the controller circuit is configured to:
detect a position of at least one corner of the polygonal retroreflective artificial tag; and
determine the heading direction further using the detected position of the at least one corner of the polygonal retroreflective artificial tag.

17. The system of claim 1, wherein the controller circuit is configured to:
determine the heading direction, including (1) determining a first heading direction using the detected first fiducial marker if the mobile cleaning robot is at a first distance away from the dock, and (2) determining a second heading direction using both the detected first fiducial marker and the detected second one or more fiducial markers if the mobile cleaning robot is at a second distance closer to the dock than the first distance; and
generate the control signal, including (1) when the mobile cleaning robot is at the first distance away from the dock, generating a control signal to adjust the first heading direction and to drive the mobile cleaning robot toward the dock in accordance with the adjusted first heading direction until the mobile cleaning robot is at the second distance away from the dock, and (2) when the mobile cleaning robot is at the second distance away from the dock, generating a control signal to adjust the second heading direction and to drive the mobile cleaning robot to the dock in accordance with the adjusted second heading direction.

18. The system of claim 1, wherein the controller circuit is configured to generate a docking status indicator for displaying on a user interface.

19. A method for docking a mobile cleaning robot to a dock, comprising:
providing the dock comprising: a first fiducial marker in a first plane; second one or more fiducial markers in a second plane different from the first plane; a docking platform for receiving the mobile cleaning robot; and a back plane behind the docking platform, wherein the first plane is parallel to the back plane with a first offset, and the second plane is parallel to the back plane with a second offset greater than the first offset;

generating an image of the dock via a visual system of the mobile cleaning robot prior to docking, and detecting from the image the first and the second one or more fiducial markers;

recognizing, via a controller circuit of the mobile cleaning robot, the dock based on the detected first fiducial marker;

determining, via the controller circuit, a heading direction of the mobile cleaning robot with respect to the dock using the detected first and the second one or more fiducial markers; and adjusting, via a drive system of the mobile cleaning robot, the heading direction of the mobile cleaning robot, and docking the mobile cleaning robot on the dock according to the adjusted heading direction.

20. The method of claim 19, wherein the second one or more fiducial markers are each laterally offset from the first fiducial marker.

21. The method of claim 19, wherein the second one or more fiducial markers each include respective retroreflective coatings attached to, or in proximity to, respective one or more charging contacts on the docking platform of the dock, the one or more charging contacts electrically coupled to a charging system of the dock to charge a battery of the mobile cleaning robot.

22. The method of claim 19, wherein:
determining the heading direction includes determining a first heading direction using the detected first fiducial marker if the mobile cleaning robot is at a first distance away from the dock, and determining a second heading direction using both the detected first fiducial marker and the detected second one or more fiducial markers if the mobile cleaning robot is at a second distance closer to the dock than the first distance; and
adjusting the heading direction and docking the mobile cleaning robot include:
responsive to the mobile cleaning robot being at the first distance away from the dock, adjusting the first heading direction and driving the mobile cleaning robot toward the dock in accordance with the adjusted first heading direction until the mobile cleaning robot is at the second distance away from the dock; and responsive to the mobile cleaning robot being at the second distance away from the dock, adjusting the second heading direction and driving the mobile cleaning robot to the dock in accordance with the adjusted second heading direction.

23. The method of claim 19, wherein the one or more second fiducial markers include a second fiducial marker and a third fiducial marker, and wherein determining the heading direction of the mobile cleaning robot includes:
measuring, from the image of the dock, a first distance between the detected first fiducial marker and the detected second fiducial marker, and a second distance between the detected first fiducial marker and the detected third fiducial marker; and
determining the heading direction based on a comparison between the first distance and the second distance.

24. The method of claim 19, comprising:
receiving dock dimension information including actual positions of the second one or more fiducial markers relative to the first fiducial marker; and
estimating positions of the second one or more fiducial markers using (1) a position of the detected first fiducial marker and (2) the actual positions of the second one or more fiducial markers relative to the first fiducial marker;
wherein determining the heading direction is based on a comparison between the estimated positions of the second one or more fiducial markers and the detected positions of the second one or more fiducial markers.

25. The method of claim 19, wherein the first fiducial marker includes a polygonal retroreflective artificial tag, the method comprising:
detecting a position of at least one corner of the polygonal retroreflective artificial tag; and
determining the heading direction further using the detected position of the at least one corner of the polygonal retroreflective artificial tag.

26. A method for docking a mobile cleaning robot to a dock, the method comprising:
providing the dock that includes a first fiducial marker in a first plane and second one or more fiducial markers in a second plane different from the first plane;
generating an image of the dock via a visual system of the mobile cleaning robot prior to docking, and detecting from the image the first and the second one or more fiducial markers;
recognizing, via a controller circuit of the mobile cleaning robot, the dock based on the detected first fiducial marker;
receiving dock dimension information including an actual distance between two fiducial markers selected from the first and second one or more fiducial markers;
measuring, from the image of the dock, a distance between the two selected fiducial markers;
determining, via the controller circuit, a heading direction of the mobile cleaning robot with respect to the dock based on a difference between the measured distance and the actual distance between the two selected fiducial markers; and
adjusting, via a drive system of the mobile cleaning robot, the heading direction of the mobile cleaning robot, and docking the mobile cleaning robot on the dock according to the adjusted heading direction.

27. The method of claim 26, further comprising:
calculating a projection component of the actual distance along a horizontal direction or along a vertical direction on a back plane of the dock; and
calculating a projection component of the measured distance along the horizontal direction or along the vertical direction,
wherein determining the heading direction is based at least in part on a difference between the projection component of the measured distance and the projection component of the actual distance.

28. A mobile robot system, comprising:
a dock comprising a first fiducial marker in a first plane, and second one or more fiducial markers in a second plane different from the first plane; and
a mobile cleaning robot including:
a drive system configured to move the mobile cleaning robot about an environment including a docking area within a distance of the dock;
a visual system configured to detect respective positions of the first fiducial marker and the second one or more fiducial markers on the dock; and
a controller circuit configured to:
recognize the dock based at least on the detected first fiducial marker;

measure a distance between two fiducial markers selected from the first and second one or more fiducial markers;

receive dock dimension information including an actual distance between the two selected fiducial markers;

determine a heading direction of the mobile cleaning robot with respect to the dock based on a difference between the measured distance and the actual distance between the two selected fiducial markers; and generate a control signal to the drive system to adjust the heading direction, and to drive the mobile cleaning robot to the dock in accordance with the adjusted heading direction.

29. The system of claim 28, where the controller circuit is configured to:

calculate a projection component of the actual distance along a horizontal direction or along a vertical direction on a back plane of the dock;

calculate a projection component of the measured distance along the horizontal direction or along the vertical direction; and determine the heading direction based on a difference between the projection component of the measured distance and the projection component of the actual distance.

\* \* \* \* \*